US012670166B1

(12) United States Patent
Cui et al.

(10) Patent No.: US 12,670,166 B1
(45) Date of Patent: Jun. 30, 2026

(54) HARDWARE ACCELERATION OF RELATIONAL OPERATIONS

(71) Applicant: Microsoft Technology Licensing, LLC, Redmond, WA (US)

(72) Inventors: Wei Cui, Vancouver (CA); Rathijit Sen, Redmond, WA (US); Peng Cheng, Redmond, WA (US); Matteo Interlandi, Torrance, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/195,580

(22) Filed: Apr. 30, 2025

(51) Int. Cl.
$G06F\ 16/2455$     (2019.01)
$G06F\ 16/245$      (2019.01)

(52) U.S. Cl.
CPC .... G06F 16/2456 (2019.01); G06F 16/24569 (2019.01)

(58) Field of Classification Search
None
See application file for complete search history.

(56) References Cited

U.S. PATENT DOCUMENTS

| | | | |
|---|---|---|---|
| 2016/0103715 A1* | 4/2016 | Sethia | G06F 12/0844 |
| | | | 718/106 |
| 2020/0265587 A1* | 8/2020 | Fan | G06T 3/18 |
| 2023/0214225 A1* | 7/2023 | Kaldewey | G06F 16/2456 |
| | | | 712/225 |

* cited by examiner

*Primary Examiner* — Eddy Cheung
(74) *Attorney, Agent, or Firm* — Alleman Hall LLP

(57) ABSTRACT

This disclosure describes an implementation of a computing system that utilizes accelerator hardware configured to perform parallel computation of matching pairs of a join operation of a database program. This computation is performed at least in part by, for each thread that determines a matching pair, computing an offset in an output tuple by adding a global rank of a respective block, an intra block rank of a respective warp, and an intra warp rank of a respective thread. This computation is further performed by storing index values for a primary key and a foreign key in a matching pair at the computed offset location in an output tuple, and outputting the output tuple.

20 Claims, 11 Drawing Sheets

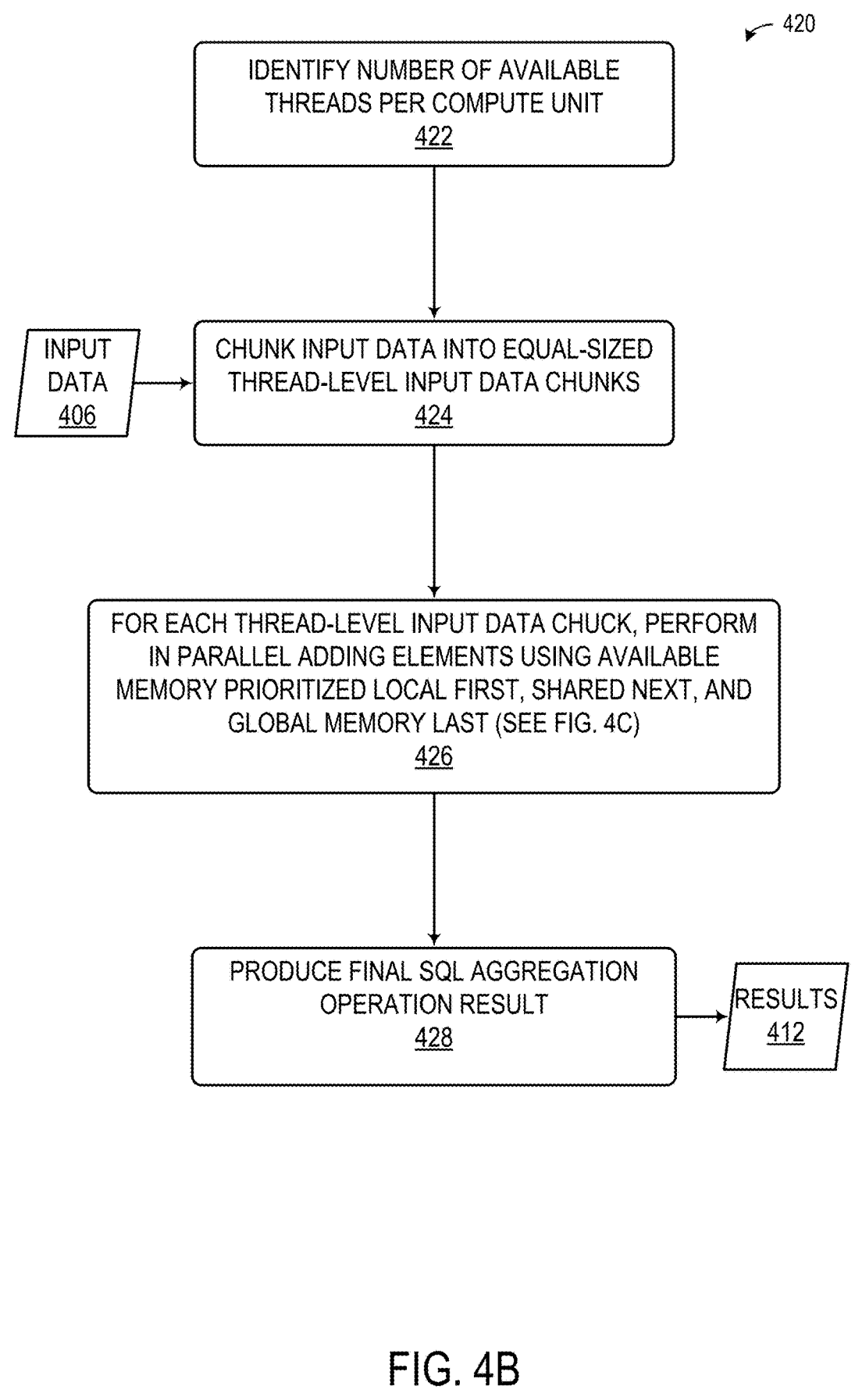

420

```
┌─────────────────────────────────────┐
│   IDENTIFY NUMBER OF AVAILABLE       │
│   THREADS PER COMPUTE UNIT           │
│                422                   │
└─────────────────────────────────────┘
                    │
                    ▼
```

```
┌──────────┐      ┌─────────────────────────────────────┐
│ INPUT    │      │  CHUNK INPUT DATA INTO EQUAL-SIZED   │
│ DATA     │─────▶│  THREAD-LEVEL INPUT DATA CHUNKS      │
│ 406      │      │                424                   │
└──────────┘      └─────────────────────────────────────┘
                                    │
                                    ▼
```

```
┌───────────────────────────────────────────────────────┐
│  FOR EACH THREAD-LEVEL INPUT DATA CHUCK, PERFORM        │
│  IN PARALLEL ADDING ELEMENTS USING AVAILABLE            │
│  MEMORY PRIORITIZED LOCAL FIRST, SHARED NEXT, AND       │
│  GLOBAL MEMORY LAST (SEE FIG. 4C)                       │
│                      426                                │
└───────────────────────────────────────────────────────┘
                            │
                            ▼
```

```
┌───────────────────────────────┐      ┌──────────┐
│  PRODUCE FINAL SQL AGGREGATION │      │ RESULTS  │
│  OPERATION RESULT              │─────▶│  412     │
│              428               │      │          │
└───────────────────────────────┘      └──────────┘
```

FIG. 4B

500

```
func memory_tier_prioritized_aggregation() {
  Loop for each thread T_ID:                              502  506
    // stage 1: //                                        504
    For each data input[x] owned by this thread:          508
      if input[x] < (Registers_per_computeunit / Threads_per_computeunit – Ɛ_0:    510
        local[input[x]] += weight[x];
      elif input[x] < (Sharedmem_per_computeunit / (Threads_per_computeunit / Class_Size)) – Ɛ_1:    516
        atomicAdd(Sharedmem_space[0, input[x]], weight[x]);    518
      else:                                               514
        atomicAdd(global_mem[input[x]], weight[x]);       520
    barrier();                                            522
    merge(to=Sharedmem_space[T_ID, *], source=local[*]);  524
    barrier();                                            526
    // stage 2: //                                        528
    For step = log2((Registers_per_computeunit /Threads_per_computeunit ) – Ɛ_0) - 1 down to 1:    530
      merge(to=Sharedmem_space[T_ID], source=Sharedmem_space[T_ID + (1 << step)])    532
    barrier();                                            534
    // stage 3: //                                        536
    merge(to=global_mem[*], from=Sharedmem_excess[*])}    538
```

OFFSET IN THE OUTPUT ARRAY IS THE SUM OF:
WARP RANK: IN-WARP RANK OF THE CURRENT THREAD
BLOCK RANK: IN-BLOCK RANK OF THE CURRENT WARP
GLOBAL RANK: RANK OF CURRENT THREAD BLOCK AMONG ALL PERFORMING JOIN

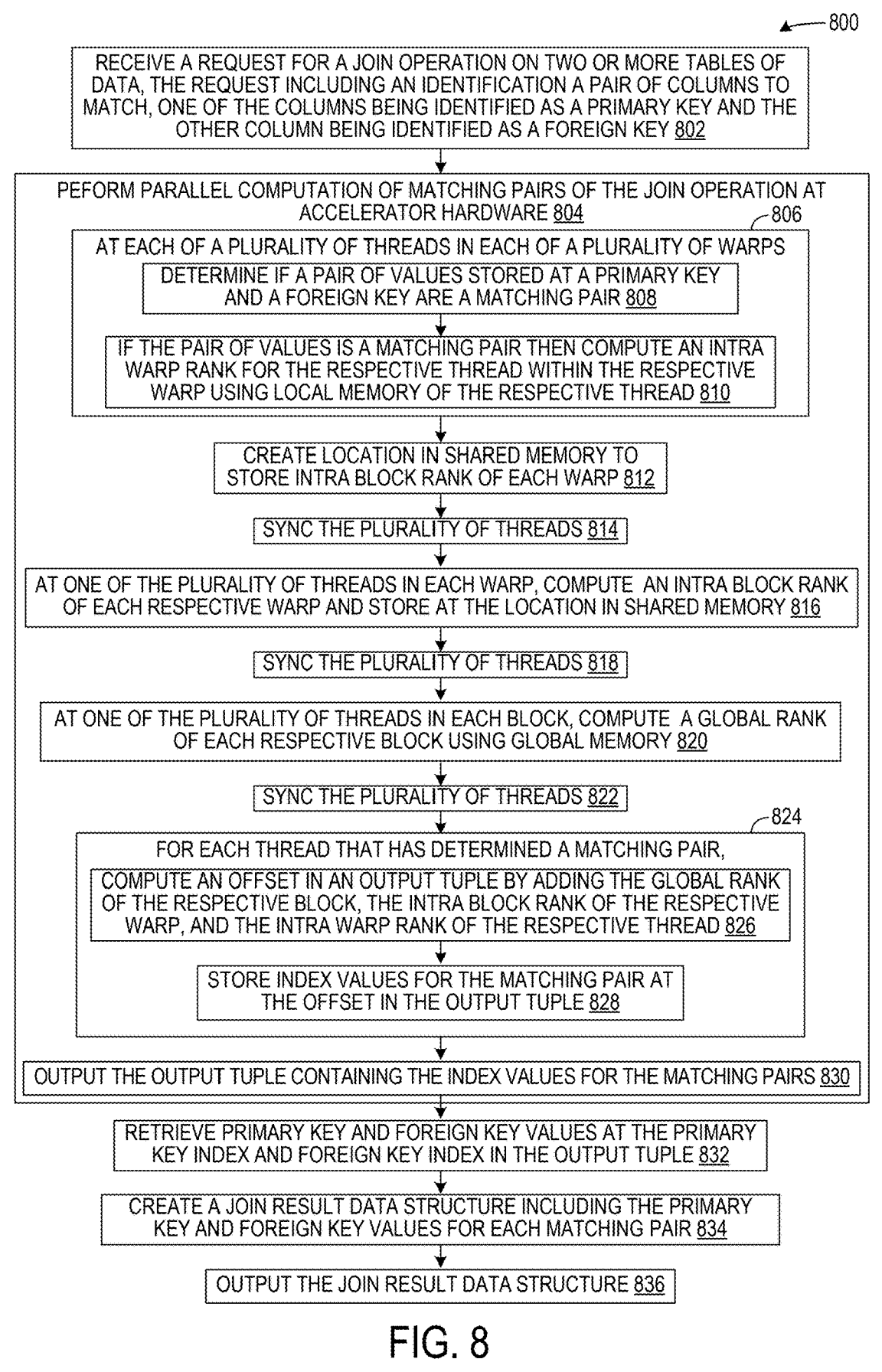

800

RECEIVE A REQUEST FOR A JOIN OPERATION ON TWO OR MORE TABLES OF DATA, THE REQUEST INCLUDING AN IDENTIFICATION A PAIR OF COLUMNS TO MATCH, ONE OF THE COLUMNS BEING IDENTIFIED AS A PRIMARY KEY AND THE OTHER COLUMN BEING IDENTIFIED AS A FOREIGN KEY 802

PEFORM PARALLEL COMPUTATION OF MATCHING PAIRS OF THE JOIN OPERATION AT ACCELERATOR HARDWARE 804

806

AT EACH OF A PLURALITY OF THREADS IN EACH OF A PLURALITY OF WARPS

DETERMINE IF A PAIR OF VALUES STORED AT A PRIMARY KEY AND A FOREIGN KEY ARE A MATCHING PAIR 808

IF THE PAIR OF VALUES IS A MATCHING PAIR THEN COMPUTE AN INTRA WARP RANK FOR THE RESPECTIVE THREAD WITHIN THE RESPECTIVE WARP USING LOCAL MEMORY OF THE RESPECTIVE THREAD 810

CREATE LOCATION IN SHARED MEMORY TO STORE INTRA BLOCK RANK OF EACH WARP 812

SYNC THE PLURALITY OF THREADS 814

AT ONE OF THE PLURALITY OF THREADS IN EACH WARP, COMPUTE AN INTRA BLOCK RANK OF EACH RESPECTIVE WARP AND STORE AT THE LOCATION IN SHARED MEMORY 816

SYNC THE PLURALITY OF THREADS 818

AT ONE OF THE PLURALITY OF THREADS IN EACH BLOCK, COMPUTE A GLOBAL RANK OF EACH RESPECTIVE BLOCK USING GLOBAL MEMORY 820

SYNC THE PLURALITY OF THREADS 822

824

FOR EACH THREAD THAT HAS DETERMINED A MATCHING PAIR,

COMPUTE AN OFFSET IN AN OUTPUT TUPLE BY ADDING THE GLOBAL RANK OF THE RESPECTIVE BLOCK, THE INTRA BLOCK RANK OF THE RESPECTIVE WARP, AND THE INTRA WARP RANK OF THE RESPECTIVE THREAD 826

STORE INDEX VALUES FOR THE MATCHING PAIR AT THE OFFSET IN THE OUTPUT TUPLE 828

OUTPUT THE OUTPUT TUPLE CONTAINING THE INDEX VALUES FOR THE MATCHING PAIRS 830

RETRIEVE PRIMARY KEY AND FOREIGN KEY VALUES AT THE PRIMARY KEY INDEX AND FOREIGN KEY INDEX IN THE OUTPUT TUPLE 832

CREATE A JOIN RESULT DATA STRUCTURE INCLUDING THE PRIMARY KEY AND FOREIGN KEY VALUES FOR EACH MATCHING PAIR 834

OUTPUT THE JOIN RESULT DATA STRUCTURE 836

FIG. 8

```
func warp_based_fast_join() {
bool is_match = htable_probe_find_index(probe_task_list[threadID], ..);
int threadsperwarp = 32;

// stage 1:
[local int] vote = __ballot(is_match);
[local int] accum = __popc(vote);
[local int] warp_rank = __popc(vote & ((1LLU << threadID % threadsperwarp) - 1));
```

> VOTE RETURNS A BITMASK WITH 1 VALUES FOR THREADS IN WARP WITH A MATCHING PAIR

> ACCUMULATE THE NUMBER OF MATCHING PAIRS BY COUNTING 1 VALUES IN VOTE BITMASK

> COMPUTE THE RANK OF THE CURRENT THREAD AMONG ALL THREADS IN THE CURRENT WARP

> CREATE VARIABLE TO STORE INTRA BLOCK ORDER OF CURRENT WARP IN SHARED MEMORY

```
// stage 2:
[lds int] intra_block_order[0] = 0;
__barrier();
if (threadID % threadsperwarp == 0)
block_rank[threadID / threadsperwarp ] = atomic_add_blk(intra_block_order[0], accum);
__barrier();
```

> ONE THREAD PER WARP COMPUTES A BLOCK RANK FOR THE WARP BY ADDING ACCUM (TOTAL MATCHES IN WARP) TO INTRA_BLOCK_ORDER IN SHARED MEMORY

> THE FIRST THREAD IN EACH BLOCK COMPUTES GLOBAL RANK OF EACH BLOCK BY PERFORMING ATOMIC ADDITION ON GLOBAL MEMORY, WHICH ADDS INTRA_BLOCK_ORDER[0] TO OUTPUT_OFFSET[0] AND RETURNS THE OLD VALUE OF OUTPUT_OFFSET[0]

```
// stage 3:
if (threadID == 0)
global_rank[0] = atomic_add_glob(&output_offset[0], intra_block_order[0]);
__barrier();
if (is_match) {
[local int] offset = global_rank[0] + block_rank[threadID / threadsperblock ] + warp_rank;
```

> EACH THREAD COMPUTES AN OFFSET TO WRITE ITS OUTPUT TO THE OUTPUT TUPLE IN GLOBAL MEMORY, BY ADDING THE GLOBAL_RANK OF THE CURRENT BLOCK, THE BLOCK_RANK OF THE CURRENT WARP, AND THE WARP_RANK OF THE CURRENT THREAD

```
// write SQL JOIN's results
output_tuple[offset] = tuple<>(.. join_pk_result_idx, join_fk_result_idx, ..);
}
```

> EACH THREAD WRITES THE PRIMARY KEY INDEX AND FOREIGN KEY INDEX OF ITS MATCHING PAIR TO THE OUTPUT TUPLE AT THE COMPUTED OFFSET LOCATION IN GLOBAL MEMORY

FIG. 9

HARDWARE ACCELERATION OF RELATIONAL OPERATIONS

BACKGROUND

Hardware acceleration via GPUs, TPUs, and the like can accelerate certain operations by performing them in parallel, as compared to execution of these operations on a central processing unit (CPU) alone. While some operations such as graphics shading or training and inference of neural networks can be greatly sped up using acceleration hardware, other operations can be difficult to accelerate using such hardware. For example, certain structured query language (SQL) operations, such as aggregation operations and join operations, are not well parallelized with conventional techniques on conventional GPUs or TPUs. As a result, computation of such aggregation and join operations can be slow to perform.

SUMMARY

To address the issues discussed herein, computer systems and methods are provided. In one aspect, a computing system is provided that comprises a central processing unit configured to execute a database program, and accelerator hardware configured to perform parallel computation of matching pairs of a join operation of the database program. This computation is performed at least in part at least in part by receiving a request for the join operation on two or more tables of data, the request including an identification of pair of columns to compare for matching in the join operation, one of the columns being designated as containing primary keys and the other column being designated as containing foreign keys. The computation is further performed by, at each of a plurality of threads in each of a plurality of warps that are grouped into a plurality of thread blocks, determining if a pair of values stored at one of the primary keys and one of the foreign keys are a matching pair, and, if the pair of values is a matching pair, then computing an intra warp rank for the respective thread within the respective warp using local memory of the respective thread. The computation is further performed by, at one of the plurality of threads in each warp, computing an intra block rank of each respective warp and storing the intra block rank at a location in shared memory, and, at one of the plurality of threads in each thread block, computing a global rank of each respective block using global memory. This computation is further performed by, for each thread that has determined a matching pair, computing an offset in an output tuple by adding the global rank of the respective block, the intra block rank of the respective warp, and the intra warp rank of the respective thread. This computation is further performed by storing index values for the primary key and the foreign key in the matching pair at the offset location in the output tuple, and outputting the output tuple.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A-4C show flowcharts of computerized methods for computing an aggregation operation using accelerator hardware, according to one or more example implementations of the present disclosure.

FIG. 5 illustrates example Compute Unified Device Architecture (CUDA) pseudocode that can be used to implement the method of FIG. 4C described herein.

FIG. 8 shows a flowchart of a method for computing a join operation on accelerator hardware according to an example implementation of the present disclosure.

FIG. 9 illustrates example CUDA pseudocode that can be used to implement the method of FIG. 8 described herein.

DETAILED DESCRIPTION

Figure 1:
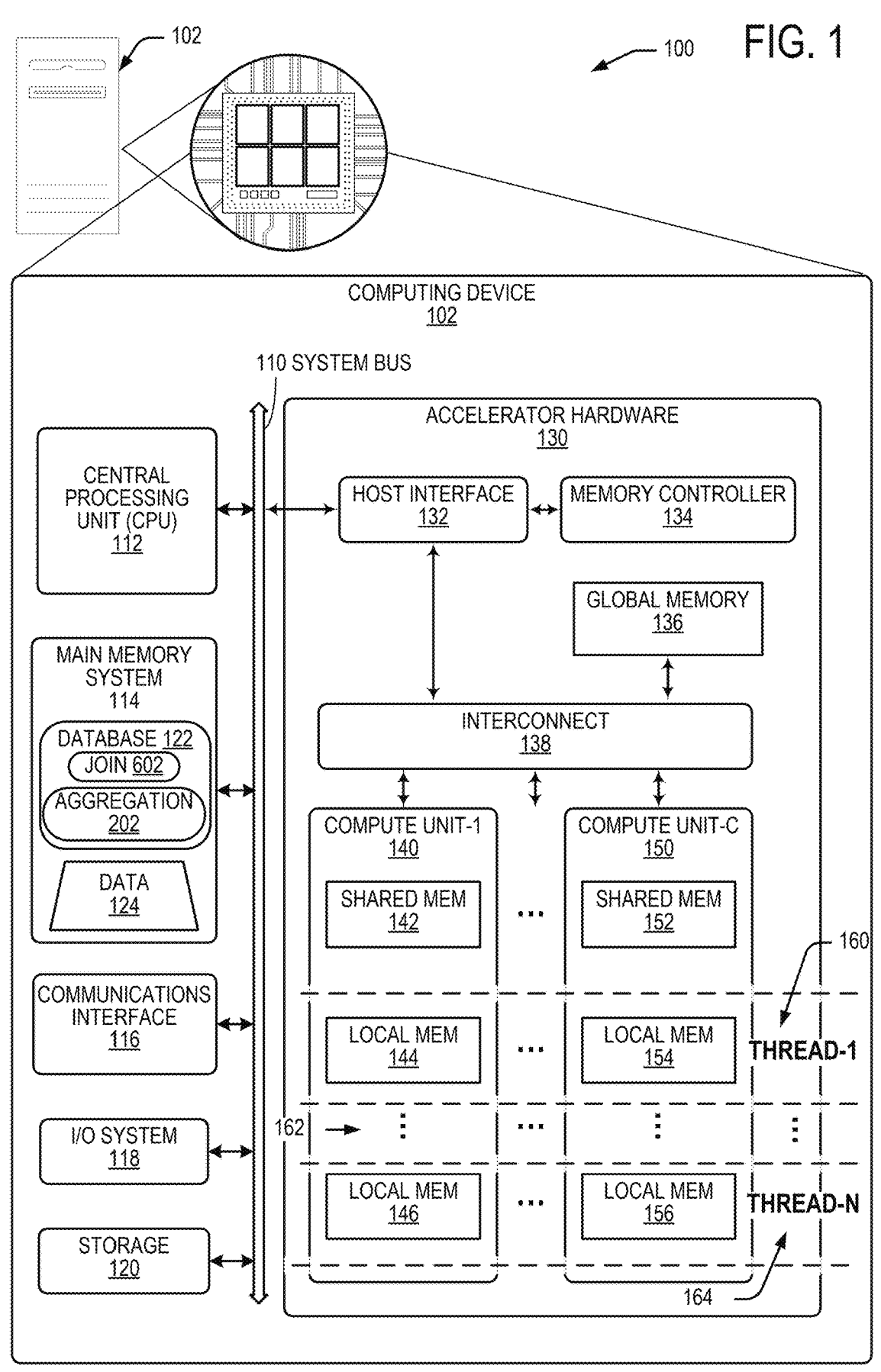
FIG. 1 shows a schematic view of an example computing system suitable for implementing a join operation and an aggregation operation via accelerator hardware with a three-tiered memory system, according to the present disclosure.

As briefly discussed above, two types of database operations, aggregation operations and join operations, are particularly difficult to accelerate on acceleration hardware, to achieve a boost in computation speed over execution on a CPU alone. Unlike other operations such as projection, predication, and filtering, which are relatively even and predictable in their computational burden, aggregation operations and join operations produce a result that heavily depends on the values of the data being aggregated or joined, and thus their computational burden is difficult to predict. For this reason, algorithms have been difficult to develop to effectively parallelize aggregation operations and join operations on the fixed compute units of acceleration hardware. Hereinbelow, it will be explained that conventional approaches to each of these operations can undesirably result in nearly serial processing and thus cannot benefit from parallelization on modern accelerator hardware.

Herein, example aggregation operations and join operations are discussed. One common language for performing such operations is SQL (pronounced "sequel"). Turning first to the aggregation operation, an aggregation operation performs computations on multiple rows of data and returns an aggregated summary result. Example aggregation operations in SQL include SUM, AVG, COUNT, MAX, MIN, etc. Consider the following example SQL aggregation operation performed by a typical computing platform with sequential instruction execution on a central processing unit. A database engine performs a SQL aggregation operation by gathering like data elements, applying mathematical operations to each set, and producing streamlined result sets with one row per set.

A sequence of steps on a typical CPU performing serial computations accomplishes the aggregation steps of a SQL aggregation operation. Because the serial operations depend on the intermediate results of the previous operations, each operation must be completed before the next operation can begin. For example, consider this data set:

TABLE 1

| Student ID | Subject | Score |
| --- | --- | --- |
| 01 | Math | 85 |
| 02 | Science | 90 |
| 03 | Math | 70 |
| 04 | Science | 95 |

To perform a SQL aggregation operation in this example, the database engine requests average scores by subject, and this triggers a series of processing phases. The first phase reads all of the records from storage. The second phase organizes records into groups based on subject. Math scores form one group. Science scores form another group. The third phase calculates the requested values for each group. Math scores average to 77.5. Science scores average to 92.5. The final phase combines group identifiers with calculated values to create result rows.

This sequential processing requires completed results from prior steps. The sequential-based central processor cannot calculate averages until all records have been placed into appropriate groups. The grouping operation must process every record before any calculations begin. Each step builds upon results from the previous step. The result has two rows. One row has Math with an average score of 77.5. The other row has Science, with an average score of 92.5. The four original records have been rearranged into summary data via aggregation.

This serial computation of the SQL aggregation operation cannot fully utilize the parallel processing capabilities of accelerator hardware like Graphics Processing Units (GPUs) and Tensor Processing Units (TPUs). Such hardware has the capability to carry out several computations concurrently on large data, but serial processing steps required by a conventional computation of the aggregation operation cause bottlenecks that drastically reduce the GPU performance. Particularly for large datasets having thousands or even millions of rows, significant processing delays can result even when performing aggregation operations on accelerator hardware. Due to this, conventional approaches do not perform SQL aggregation operations on accelerator hardware, but rather perform such operations at the CPU.

To address these issues, FIG. 1 shows a schematic view of an example computing system 100 configured to implement a structured query language (SQL) aggregation operation with a three-tiered memory system. As depicted, computing system 100 includes a computing device 102 that includes at least one CPU 112, a main memory system 114, a communication interface 116, an input/output (I/O) system 118, a storage system 120, communicatively linked by a system bus 110 to each other and to accelerator hardware 130. The storage system 120 stores programs in a non-volatile manner, which can be loaded into the main memory system 114 and executed by the CPU 112 using portions of the main memory system 114. Thus, a solid state hard drive can be used as the storage system 120 and random access memory (RAM) can be used as the main memory system, in one example. As depicted, a database engine 122 of a relational database and data 124 are stored in the storage device 120 and at least partially loaded into the main memory system 114 during execution. The database engine 122 is configured to operate on data 124 to perform aggregation operations 202 and join operations 602, for example, in response to SQL queries.

To aid the CPU in performing the aggregation an join operations in the manner described herein, accelerator hardware 130 is provided. The accelerator hardware 130 includes a host interface 132 configured to enable input/output operations with the system bus 110 to communicate with the CPU and memory, a memory controller 134 to control off-chip memory operations, a global memory 136, an interconnect 138 to transmit on-chip communications, and multiple compute units 140, 150 that perform logic operations on data in parallel. The accelerator hardware 130 is designed to perform specific tasks more efficiently and faster than performance on CPU 112 alone, in large part due to parallel processing by the compute units 140, 150 therein.

In some examples, the accelerator hardware 130 may be configured as a graphics processing unit (GPU), Tensor Processing Unit (TPU), or neural processing unit (NPU), for example. In other examples, accelerator hardware may be configured as custom silicon in the form of an application-specific integrated circuit (ASIC), or as a field programmable gate array (FPGA).

The accelerator hardware 130 contains a plurality of compute units 140, 150 that can execute threads in parallel to perform computations necessary to perform the aggregation (or join) operation. Accelerator hardware 130 employs a three-level memory system, including local memory 144, 154, 146, 156, shared memory 142, 152, and global memory 136. Local memory 144, 154, 146, 156 is private to each thread, and being the most closely coupled has the lowest latency. Being private, read and write operations to local memory by a specific thread are not blocking of other threads, ensuring parallelism. In one example, local memory is provided with a registry size of 256 KB, and an access speed of 30 TB/s. A middle level is shared memory 142, 152, which can be accessed by all threads of the same thread block being executed on a compute unit 140, 150, to enable collaboration. Access to shared memory 142, 152 has relatively low latency, but being shared, can be blocking for threads within the thread block, slowing down parallelism. In one example, shared memory 142, 152 has a cache size of 4 MB and access speeds of 17 TB/s. Typically, global memory 136 is the largest and slowest level among on-chip memory of the accelerator hardware 130, accessible to all threads of all thread blocks across the compute units 140, 150 on the accelerator hardware 130. In one example, 80 GB of high bandwidth memory (HBM) on the accelerator hardware chip itself is provided as global memory 136, with an access speed of 2 TB/s. In one example, each compute unit 140, 150 is configured to execute multiple thread blocks, each of which contains 32 warps of 32 threads each (i.e., 1024 threads per thread block).

The three-tiered memory hierarchy contrasts with the uniform memory access model of typical central processor-based computers. For example, main memory system 114 of the CPU 112 typically has 0.5 to 1 terabytes (or more) of RAM, but has a higher latency with access speeds of 0.1-0.3 TB/s if accessed by threads on the accelerator hardware 130.

The host interface 132 is a communications bridge between the accelerator hardware 130 with the CPU 112 and the main computing components 110. The host interface 132 manages data transfers and control signals between the accelerator hardware 130 and the main computing components 110. The host interface 132 handles memory mapping between the main memory system 114 and the memory systems of the accelerator hardware 130. The host interface 132 processes commands sent from the CPU 112 of the main computing components 110 that initiate computational tasks. The host interface 132 may be implemented, for example, by PCIe™ (Peripheral Component Interconnect Express), AMBA (Advanced Microcontroller Bus Architecture), or CXL (Compute Express Link).

The memory controller 134 manages data movement between various processing elements of the accelerator hardware 130 and the various memory types of the three-tiered memory system. The memory controller 134 handles address translation, timing, scheduling, and request coalescing to optimize data transfers. The memory con 134 performs multi-channel partitioning for higher bandwidth, error detection/correction for data integrity, and compression to reduce bandwidth needs. The memory con 134 also manages memory power states for energy efficiency.

The global memory 136 is the primary storage for the accelerator hardware 130. The global memory 136 is called this because it is a memory space accessible by all threads of all compute units of the accelerator hardware. The global memory 136 typically provides large space (e.g., multiple terabytes (TB) or more) with high bandwidth (e.g., 1-2 TB/s) but relatively high latency (e.g., hundreds of clock cycles). Typically, the global memory 136 stores input data, output results, and large data structures that don't fit in other memory tiers.

The interconnect 138 is an internal communication network linking compute units with memory and other components. That is, the interconnect 138 is internal to the accelerator hardware 130. The interconnect 138 transports data, instructions, and control signals throughout the accelerator. The interconnect manages traffic flow between compute units and the hierarchical three-tiered memory system while maintaining memory coherence. The interconnect 138 determines routing to minimize congestion during parallel operations. The interconnect 138 may be implemented, for example, via crossbar networks, fabric interconnects, mesh architectures, ring buses, and hierarchical networks.

The accelerator hardware 130 has multiple compute units. This is depicted in FIG. 1 by showing a first compute unit (which is labeled compute unit-1 140) and a $C^{th}$ compute unit (which is labeled compute unit-C 150) with ellipses therebetween. The letter C indicates the last of multiple compute units. For example, if the accelerator hardware 130 had twenty compute units, then C would be twenty. Indeed, an implementation of the accelerator hardware 130 may have 10-120 compute units or more. The ellipses shown between compute unit-1 140 and compute unit-C 150 indicate the other like compute units therebetween.

Unless stated otherwise, the description below of compute unit-1 140 applies to compute unit-C 150 and the other compute units of the accelerator hardware 130. The compute unit-1 140 is one of the elementary processing blocks of the accelerator hardware 130. The compute unit-1 140 contains multiple components to execute instructions in parallel with the rest of the compute units. That is, the compute unit-1 140 executes in parallel with the compute unit-C 150 and the rest of the compute units.

Like the other compute units, compute unit-1 140 includes arithmetic logic units, floating-point units, and specialized function units. The compute unit-1 140 supports its own thread scheduling and execution. Independent operations provide efficient parallel processing. The compute unit-1 140 is an integrated circuit that contains processing logic. The parallel compute units may be referred to as streaming multiprocessors, compute units, execution units, neural compute units, or tensor processing units, etc.

The compute unit-1 140 includes a shared memory 142 for intra-unit thread storage and communication and local memory for intra-thread storage for each thread executing on the computer unit-1 140. Likewise, the compute unit-C

150 includes a shared memory 152 for intra-unit thread storage and communication and local memory for each thread executing on the computer unit-C 150. Moreover, there is a similar arrangement for the other compute units.

Each compute unit executes N threads, where N is a plurality, such as 10, 20, or more. For each thread, there is a local memory for intra-thread storage and communication. As shown in FIG. 1, the compute unit-1 140 has a local memory 144 for Thread-1 160, a local memory 146 for Thread-N, and, as indicated by the ellipse therebetween, one or more local memories for threads therebetween. Likewise, the compute unit-C 150 has a local memory 154 for Thread-1 160, a local memory 156 for Thread-N, and, as indicated by the ellipse therebetween, one or more local memories for threads therebetween. Moreover, there is a similar arrangement for the other compute units. While the compute units include shared and local memory, each compute until has access to the global memory 138 through the interconnect 136.

Note that each thread operates separately on a single compute unit (although a compute unit can execute multiple threads concurrently). But collectively—across the compute units—the threads operate in parallel on potentially the same data sets. Thus, the thread indicators (Thread-1 160 and Thread-N 164) represent different threads running on the different compute units.

In the compute unit-1 140 (and also in the other compute units), the shared memory and the local memory provide different functionalities in the hierarchical three-tiered memory system. These memory tiers work together to support each compute unit's parallel processing capabilities by facilitating both collaborative and independent operations among threads.

The shared memory (e.g., shared memory 142 and shared memory 152) is a medium-bandwidth, medium-latency memory space accessible by multiple threads within a common thread block assigned thereto. For example, shared memory has a latency of around 5-20 clock cycles. This is slower than local memory (e.g., 1-2 cycles) but much faster than global memory (e.g., hundreds of cycles). For example, shared memory delivers a bandwidth of about 5-20 TB/s. This is between the fast local memory and the slower global memory, with transfer rates ranging from hundreds of GB/s to 8 TB/s.

The shared memory is a programmable cache accessible by all threads of the same compute unit. This enables data sharing between threads working on related computations. Typically, shared memory provides faster access speeds than global memory and functions as a program-managed area where threads communicate, store intermediate results, and process data cooperatively.

The local memory (e.g., local memory 144 and local memory 154) is private storage allocated for a specific thread. The local memory is a high-bandwidth (e.g., kilobytes per thread), low-latency (e.g., 1-2 clock cycles) private memory space allocated to and accessible by individual threads of a compute unit assigned thereto. Physically, local memory is often implemented using registers within the compute unit or through dedicated memory areas. Each thread has exclusive access to its local memory, which contains thread-specific variables, loop counters, and temporary calculation results. Typically, local memory size is limited (e.g., kilobytes per thread) but has very low access latency.

The local memory holds thread-specific variables, registers, and temporary calculations. Local memory supplies individual execution contexts for all of the threads within the compute unit. This facilitates independent processing. Local memory will be physically part of the compute unit as memory registers or dedicated memory areas.

The accelerator hardware 130 may include caches, and the caches sit within the hierarchical three-tiered memory system by access pattern and function. The tier of local memory contains memory registers with direct access for thread-specific data. L1 cache sometimes operates in the tier of local memory for per-thread data access. At the shared memory level, L1 cache is usually present, providing fast access to the recently used data to every thread in a compute unit. Shared memory tier can include texture cache and constant cache. Texture cache is intended for spatial data access patterns for graphics computation. Constant cache stores read-only data that does not alter during execution.

At the global memory level, L2 cache serves as a buffer between global memory and compute units, reducing access times to main GPU memory for all compute units. L3 cache, if present in some architectures, also operates at the global level, adding another layer of buffering before accessing the whole global memory. These caches can reduce memory latency by moving such frequently used data closer to the processing units that use it.

Figure 2:
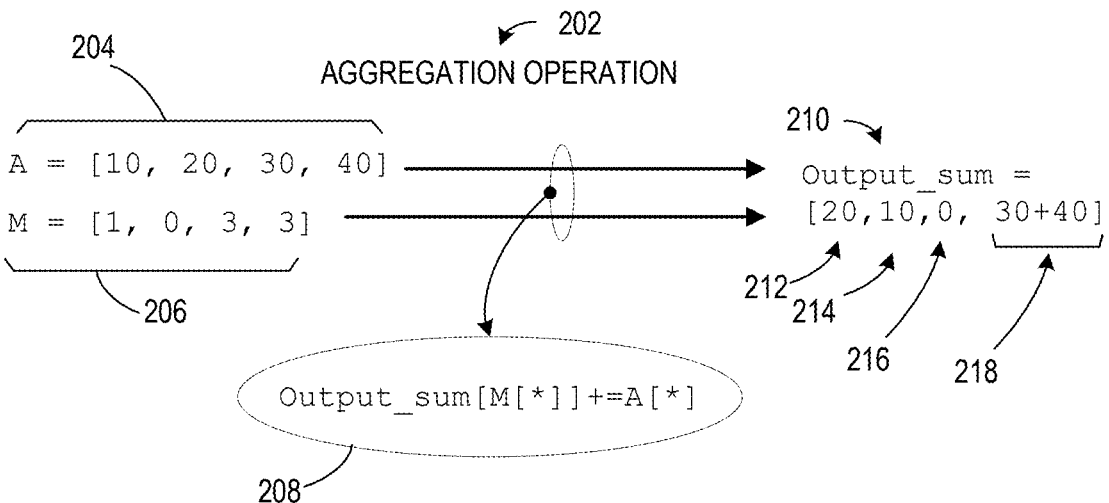
FIG. 2 illustrates a schematic representation of an aggregation operation performed by the computing system of FIG. 1.

FIG. 2 illustrates a schematic representation of a SQL aggregation operation 202. FIG. 2 shows the following two arrays of input data-input data array A 204 and input data array M 206 as an example.

Input data array A: [10, 20, 30, 40]

Input data array M: [1, 0, 3, 3]

To perform an aggregation operation on these input data arrays, first, like values are grouped together. This may be accomplished using a histogram accumulation, where the data of input data array M 206 provides the indices for binning the values in input data array A 204. The aggregation operation 202 functions in accordance with an output sum formula 208: Output_sum[M[*]]+=A[*]. This operation adds each value of A[i] to the output array at index M[i]. This results in, for example, the output_sum array 210.

On a typical sequential processor, the aggregation operation 202 begins with an empty output array, output_sum=[0, 0, 0, 0], which accommodates all possible destination indices from input data array M 206. Next, the sequential processor systematically processes each element from input data array A 204 and input data array M 206 in sequence. For example, first, A[0]=10 is added to output_sum array 210 at position M[0]=1, which changes output_sum array 210 to [0, 10, 0, 0]. The value 10 of output_sum array 210 is shown at 214.

Next, A[1]=20 is added to output_sum array 210 at position M[1]=0, resulting in output_sum array 210 becoming [20, 10, 0, 0]. The value of 10 output_sum array 210 is shown at 212. Moving to the third element, A[2]=30 is added to output_sum array 210 at position M[2]=3, which changes output_sum array 210 to [20, 10, 0, 30]. As shown at 218, the value of 30 is part of the interim result for the output_sum array 210. Finally, A[3]=40 is added to the same bin position as the previous step since M[3]=3. This results in the last part of the array of output_sum array 210 accumulating another value and becoming [20, 10, 0, 30+40]. As shown at 218, the value of 30+40 is shown as part of the output_sum array 210. That value is 70, but it is shown as "30+40" to illustrate that two values are being summed. Since the third element 216 of the output_sum array 210 was not affected, it remains zero.

Figure 3:
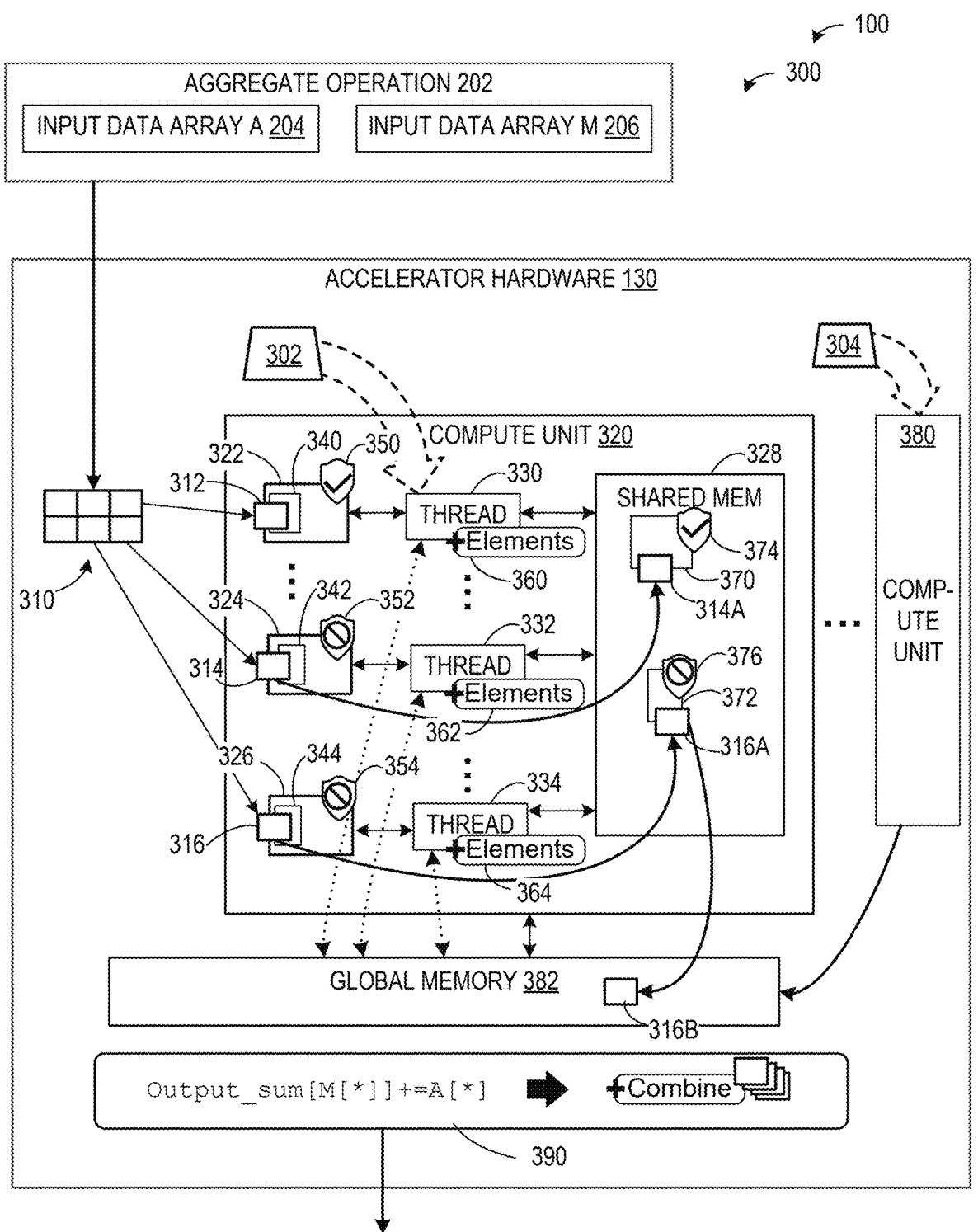
FIG. 3 illustrates an aggregation operation performed on the accelerator hardware of the computing system of FIG. 1.

Turning now to FIG. 3, a first embodiment of the present disclosure will now be described. FIG. 3 illustrates SQL aggregation 300 performed on the accelerator hardware 130, which utilizes the hierarchical three-tiered memory system (e.g., local, shared, and global memory) described above and employs a specific processing algorithm that takes advantage of the parallel processing capacity of the hardware, as discussed below.

As shown, the SQL aggregation 300 includes aggregate operation 202, accelerator hardware 130, input data 310, input data chunks (such as chunks 312, 314, and 316), a number of available threads per compute unit ("Threads_per_computeunit") (such as 302 and 304), compute units (such as 320 and 390), local memory associated with a thread of a compute unit, threads of a compute unit, shared memory 328, global memory 382, and combination of intermediate results 390.

The aggregate operation 202 may be initiated by a database engine (e.g., database engine 122) of a central processor (e.g., CPU 112) within a computing system (e.g., computing system 100). The central processor may delegate the aggregate operation 202 to an accelerator hardware (e.g., accelerator hardware 130). The input data (such as input data 310) is provided to the accelerator hardware as part of the aggregate operation 202.

The accelerator hardware 130 performs aggregate operations using its parallel processing capacity and utilizes its hierarchical three-tiered memory system. Typical sequential processing can lead to bottlenecks in aggregation operations, as discussed above. As noted above, with sequential processing, all data passes through a single processing unit and uses common memory. The limitation of sequential processing can be overcome by performing an aggregation operation on accelerator hardware 130 in accordance with the technology described herein.

The input data 310 includes at least two input data arrays, such as input data array A 204 and input data array M 206. As discussed later, the accelerator hardware 130 divides the input data 310 into equal-sized thread-level input data chunks (e.g., chunks 312, 314, and 316).

The number of available threads (e.g., 302 and 304) for each compute unit may vary depending on the particulars of the accelerator architecture. Typically, thread counts range from a few per core to thousands per core. Additionally, operating system constraints and/or virtualization layers can impact thread allocation. Other factors that can affect thread availability include power, temperature tolerances, workload type, thread switching, and the like.

Two compute units are depicted: compute unit 320 and 380. Ellipses are shown between compute units 320 and 380, indicating that there are multiple compute units between them. While details are not shown for computer unit 380, such details are similar to those depicted for compute unit 320. Compute units (such as compute units 320 and 380) are parallel processors that include execution resources (e.g., arithmetic logic units, registers, local memory, and shared memory) capable of running multiple threads simultaneously to perform calculations.

As shown with compute unit 320, each thread (e.g., threads 330, 332, 334) has an element_addition operation (e.g., element_add 360, 362, 364). This represents the addition operation performed on the elements of the arrays found in the input data chunks that a thread is working on.

As shown with compute unit 320, each compute unit has a shared memory 328 and local memory assigned to each thread. Local memory is assigned to a single thread of a compute unit. Local memory utilizes local registers, where threads of each compute unit operate on independent pieces of data without requiring synchronization between the threads. The local memory is memory that is private to each thread, and is sometimes referred to as private memory. For example, local memory 322 is assigned to thread 330 of compute unit 320, local memory 324 is assigned to thread 332 of compute unit 320, and local memory 326 is assigned to thread 334 of compute unit 320. Ellipses between threads 330, 332, 334 indicate that there are multiple threads executed on compute unit 320.

Each compute unit includes shared memory (e.g., shared memory 328 of compute unit 320) that is shared by the threads (e.g., 330, 332, 334) of the same compute unit. With an implementation of the aggregation operation 202 described herein, shared memory (e.g., shared memory 328) employs block-level aggregation using logarithmic reduction patterns, where threads of the same shared memory of a compute unit share data. Note that based on logarithmic reduction, all parallel threads updating values in this shared memory will not need to be based on costly atomic transactions. This is different than the operation performed by the code at 518, in FIG. 5 where atomic transactions are needed.

The accelerator hardware includes global memory 382, as described above. The global memory 382 is accessible to the threads (e.g., threads 330, 332, 334) of any compute unit (e.g., compute units 320 and 380). With an implementation of the aggregation operation described herein, global memory 382 is utilized to achieve optimum results with reduced cross-block synchronization. Data is passed from local memory to shared memory, and ultimately to global memory prior to output, when performing the aggregation operation 202.

As shown in FIG. 3, the accelerator hardware 130 combines the intermediate results at 390 found in the various memory locations. Thus, the accelerator hardware 130 calculates the results of the output sum formula 208: Output_sum[M[*]]+=A[*]. And then, it passes that back to the database engine (of, for example, database 122) of the central processor (e.g., CPU 112) of the computing system (e.g., computing system 100).

As depicted, the SQL aggregation 300 starts with aggregate operation 202, which includes input data 310. The accelerator hardware 130 identifies the number of available threads ("Threads_per_computeunit") for each compute unit. As depicted, Threads_per_computeunit 302 for compute unit 320 and Threads_per_computeunit 304 for compute unit 380 are computed.

The accelerator hardware 130 chunks the input data 310 into equal-sized thread-level input data chunks. Each chunk is assigned to one of the available threads of a compute unit. As depicted, chunks 312, 314, and 316 are assigned to computer unit 320. The threads operate on the thread-level input data chunk concurrently across their compute unit and across all threads of active compute units. That is, the actions are performed in parallel, with each thread working on its assigned data chunk.

The accelerator hardware 130 determines the size of the available local memory tile for each thread of a compute unit, which is based on a ratio of available registers in a compute unit to the number of available threads for each compute unit (e.g., Registers_per_computeunit/ Threads_per_computeunit). This ratio value shows how many registers each thread can access during processing operations. Higher ratios allow threads to store more intermediate values locally.

A memory tile is a fixed section of memory that organizes data for efficient processing. Memory tiles have specific dimensions and boundaries. These structures enable simultaneous data access. Typically, memory tiles align with cache boundaries to reduce access latency. This alignment helps optimize data movement between levels of the memory hierarchy.

Thread 330 has assigned local memory 322, which has memory tile 340 sized in accordance with a ratio of available registers per thread in the compute unit 330 to the number of available threads for the compute unit 330. Similarly, thread 332 has assigned local memory 324, which contains a memory tile 342 sized in the same manner, and thread 334 has assigned local memory 326, which contains a memory tile 344 sized in the same manner.

As depicted, the accelerator hardware 130 determines whether the input data chunk 312 fits within the memory tile 340 of the local memory 322 associated with the thread 330 of the compute unit 320. As indicated by an "approval" mark 350, the input data chunk 312 fits into the memory tile 340.

Consequently, the thread 330 may perform its portion of the aggregate operation on the data of the input data chunk 312 using the local memory 322. That is, this portion of the aggregate operation is performed without employing shared or global memory. This portion of the aggregate operation includes thread 330 performing the addition of elements (e.g., values) into the indices of the input data chunk 312.

The addition in the local memory context may be accomplished via a direct addition because local memory is private to its corresponding thread. Because of this, no atomic operation is necessary because only one thread is accessing the local memory. Note that addition is just one example in FIG. 3, and the same mechanism also applies for all other accumulation operators, such as max, min, logical- and/or, bitwise and/or and other similar accumulation operators.

In a similar manner, the accelerator hardware 130 determines whether the input data chunk 314 fits within the memory tile 342 of the local memory 324 for the thread 332. As indicated by a "disapproval" mark 352, the input data chunk 314 does not fit into the memory tile 342.

Consequently, the accelerator hardware obtains the size of the available shared memory tile (e.g., memory tile 370) for each compute unit. In some implementations, the size is based on a ratio of available shared memory in a compute unit to the number of available threads per block size for each compute unit. (e.g., Sharedmem_per_computeunit/ (Threads_per_computeunit/block_size)). This ratio value indicates the amount of shared memory that can be accessed during processing operations. Higher ratios allow threads to store more intermediate values in shared memory Threads_per_computeunit/block_Size is the number of thread blocks within each compute unit. This calculation divides the total threads in a compute unit by the block size to determine the number of distinct working blocks required for memory allocation purposes. Block size ("block_size") is the number of threads that function as a single work unit within a compute unit, i.e., threads per thread block.

The accelerator hardware 130 determines whether input data chunk 314A fits within a memory tile 370 of the shared memory 328 for the compute unit 320. Because input data chunk 314A is the same as input data chunk 314, it is given a similar reference label, but it is slightly different, indicating that it is being tested with relation to a different type of memory (namely, shared memory). As indicated by a "approval" mark 374, the input data chunk 314A does fit into the memory tile 370.

Accordingly, the thread 330 may perform its portion of the aggregate operation on the data of the input data chunk 312A using the shared memory 328. That is, this portion of the aggregate operation is performed without employing local or global memory. This portion of the aggregate operation includes thread 330 performing the addition of elements (e.g., values) into the indices of the input data chunk 314A.

The addition in the shared memory context may be accomplished via an atomic add and fetch operation. In the context of accelerator hardware 130, an atomic add and fetch operation adds a value to a working memory location and returns the new result in one uninterruptible step. This operation prevents race conditions in parallel processing. No other thread can modify the working memory location during execution.

Likewise, the accelerator hardware 130 determines whether the input data chunk 316 fits within the memory tile 344 of the local memory 326 for the thread 334. As indicated by a "disapproval" mark 354, the input data chunk 316 does not fit into the memory tile 344.

Consequently, the accelerator hardware 130 determines whether input data chunk 316A fits within a memory tile 372 of the shared memory 328 for the compute unit 320. Because input data chunk 316A is the same as input data chunk 316, it is given a similar reference label, but it is slightly different, indicating that it is being tested with relation to a different type of memory (namely, shared memory). As indicated by a "disapproval" mark 376, the input data chunk 3146A does not fit into the memory tile 372.

Accordingly, the thread 330 may perform its portion of the aggregate operation on the data of the input data chunk 312B using the global memory 382. That is, this portion of the aggregate operation is performed without employing local or shared memory. Global memory (e.g., global memory 382) is utilized to achieve ultimate results with reduced cross-block synchronization.

Because input data chunk 316C is the same as input data chunks 316 and 316A, it is given a similar reference label, but it is slightly different, indicating that it is being used in relation to a different type of memory (namely, global memory). The thread 330 performs the addition of elements (e.g., values) into the indices of the input data chunk 312C. This may employ atomic add and fetch operations.

Once all threads have finished processing their input data chunks, the accelerator hardware 130 performs a combination of intermediate results (e.g., reduction) at 390. The accelerator hardware 130 combines the partial or intermediate results found in the various memory locations. The accelerator hardware 130 calculates the output sum results using the formula: Output_sum[M[ ]]+=A[ ]. Then the accelerator hardware sends these results back to the database engine in the central processor (CPU 112) of the computing system 100.

Figure 4A:
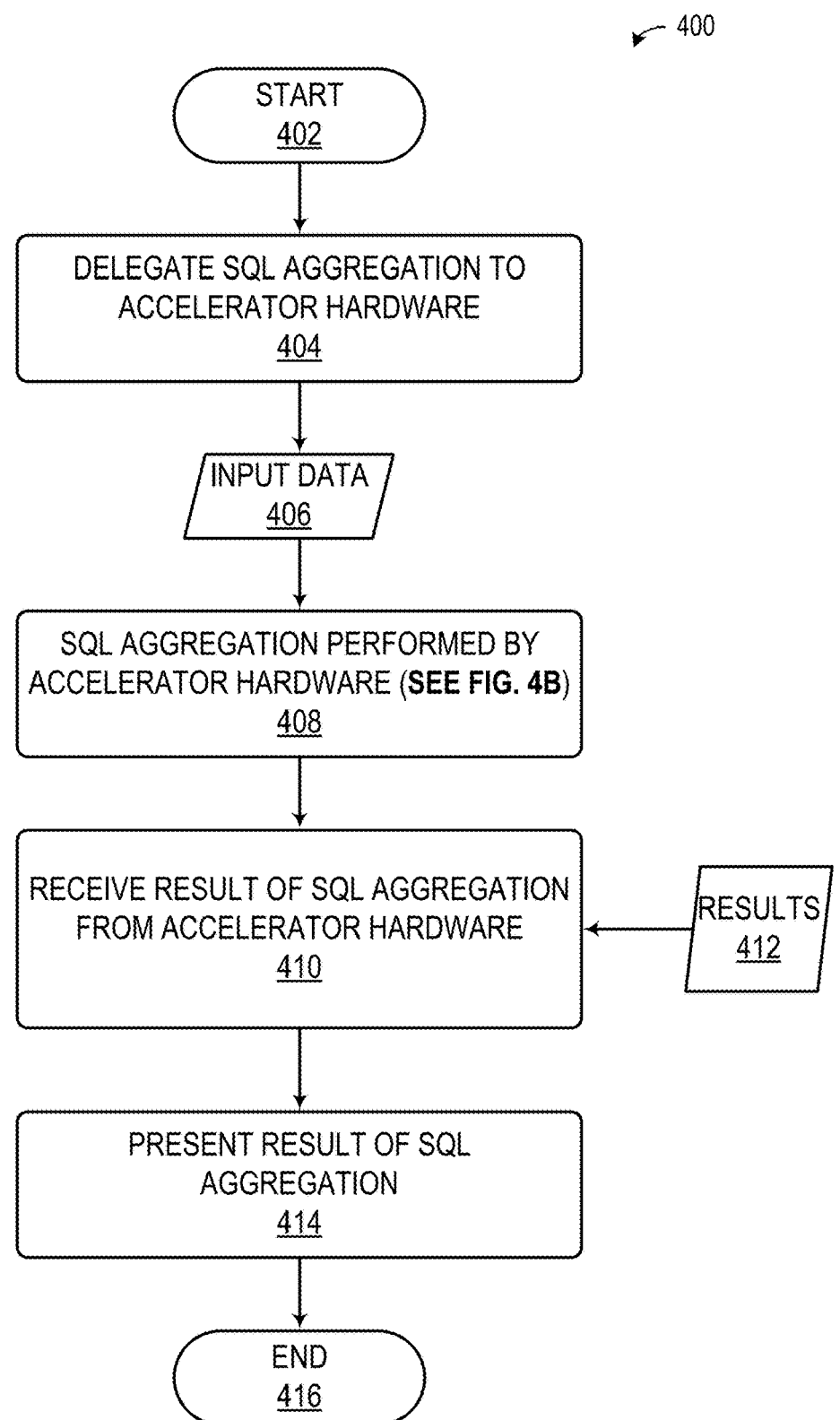
Figure 4C:
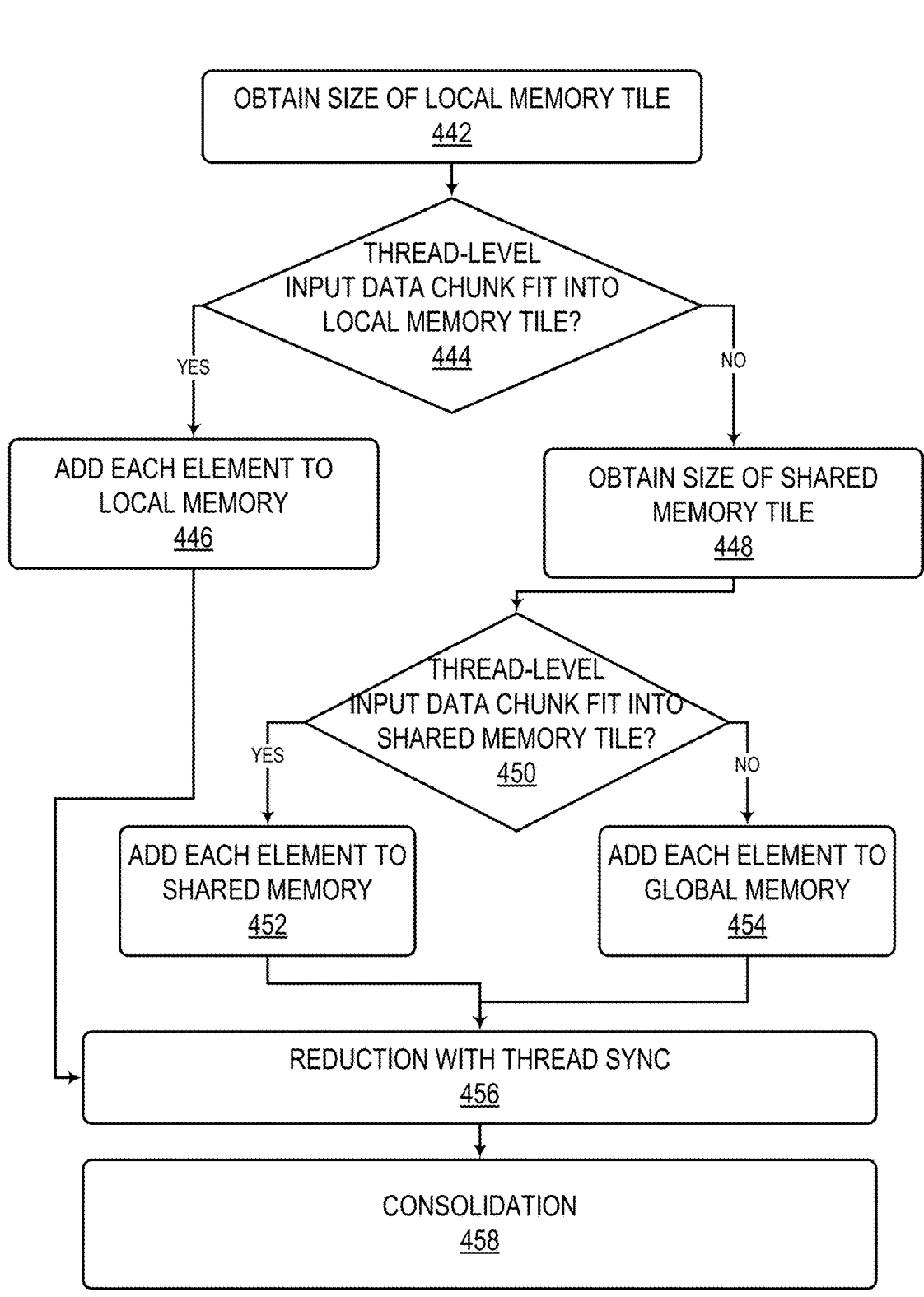

Turning now to FIGS. 4A-4C, methods 400, 420, and 440 according to the first embodiment of the present disclosure are described. Methods 400, 420, and 440 can be implemented using computing system 100 described above or other suitable computing hardware. More particularly, method 440 can be implemented using the accelerator hardware 130 described above or other suitable computing hardware.

FIG. 4A shows method 400, which includes, at 402, a start of the method, which may be initiated by a database engine (of, for example, database 122) of a central processor (e.g., CPU 112) of a computing system (e.g., computing system 100). At 404, an aggregation operation, such as a SQL aggregation operation, is delegated to accelerator hardware (e.g., accelerator hardware 130). The SQL aggregation operation (e.g., aggregation operation 202) includes input data 406 (e.g., input data 310). At 406, the input data is provided to the accelerator hardware as part of the aggregate operation 202.

At 408, the SQL aggregation operation is performed by the accelerator hardware as shown in method 420 of FIG. 4B and in its accompanying description below. At 410, results 412 of the SQL aggregation performed by the accelerator hardware are received therefrom. At 414, the results of SQL aggregation are outputted and/or presented (e.g., displayed, stored, and/or printed). At 416, the method 400 ends.

FIG. 4B shows method 420, which starts, at 422, with the accelerator hardware (e.g., accelerator hardware 130) identifying a number of available threads ("Threads_per_computeunit") on a compute unit (e.g., compute unit 320) of accelerator hardware (e.g., accelerator hardware 130) having a plurality of compute units.

At 424, the accelerator hardware chunks the input data 406 into the identified number of equal-sized thread-level input data chunks. Each thread-level input data chunk is associated with (e.g., assigned to) a respective one of the threads (e.g., thread 330) of a compute unit (e.g., compute unit 320).

At 426, for each thread-level input data chunk, the accelerator hardware performs a parallel addition of elements within each chunk using the available memory tiers in order of prioritization: local memory first, shared memory next, and global memory last. This is performed by the accelerator hardware as shown in method 440 of FIG. 4C and in its accompanying description below.

At 428, the accelerator hardware produces the final results 412 of the SQL aggregation and sends it to the database engine that delegated the operation to the accelerator hardware.

FIG. 4C shows method 440, which, for each thread-level input data chunk, the accelerator hardware performs a parallel addition of elements within each chunk using the available memory tiers in order of prioritization: local memory first, shared memory next, and global memory last. The method 440 is performed by accelerator hardware (such as accelerator hardware 130).

At 442, the accelerator hardware obtains the size of the available local memory tile for each thread of a compute unit. In some implementations, the size is based on a ratio of available registers per thread in a compute unit to the number of available threads for each compute unit (e.g., Registers_per_computeunit/Threads_per_computeunit). This ratio value shows how many registers each thread can access during processing operations. Higher ratios allow threads to store more intermediate values locally.

At 444, the accelerator hardware determines if the thread-level input data chunk fits into the tile of available local memory. That is, the accelerator hardware determines whether the thread-level input data chunk fits within a local memory tile—based on the obtained size of available local memory tile—of the local memory associated with each thread of the compute unit.

If it does fit, then the "Yes" arrow leads to 446, where the accelerator hardware adds each element in the thread-level input data chunk to a corresponding memory location in the tile of available local memory. That is, each element of the input data chunk is added in the local memory. This portion of the aggregate operation is performed without employing shared or global memory. The associated thread performs the addition of elements (e.g., values) into the indices of its input data chunk. This may employ direct aggregation operations such as addition.

If it does not fit, then the "No" arrow leads to 448, where the accelerator hardware obtains the size of the available shared memory tile for a compute unit. In some implementations, the size is based on a ratio of available shared memory in a compute unit to the number of available thread blocks for each compute unit. (e.g., Sharedmem_per_computeunit/(Threads_per_computeunit/block_size)). This ratio value indicates the amount of shared memory that can be accessed during processing operations.

At 450, the accelerator hardware 130 determines if the thread-level input data chunk fits into the tile of shared memory. That is, the accelerator hardware 130 determines whether the input data chunk fits within a shared memory tile, based on the obtained size of the available shared memory tile of the shared memory associated with the compute unit.

If it does fit, then the "Yes" arrow leads to 452, where the accelerator hardware adds each element in the thread-level input data chunk to a corresponding memory location in the tile of available shared memory. That is, each element of the input data chunk is added in the shared memory. This portion of the aggregate operation is performed without employing local or global memory. The associated thread performs the addition of elements (e.g., values) into the indices of its input data chunk. This may employ atomic add and fetch operations.

If it does not fit, then the "No" arrow leads to 454, the accelerator hardware adds each element of the thread-level input data chunk to a corresponding memory location in the tile of available global memory. That is, the accelerator hardware may perform its portion of the aggregate operation on the data of the input data chunk using global memory. That is, this portion of the aggregate operation is performed without employing local or shared memory. Global memory is utilized to achieve ultimate results with reduced cross-block synchronization.

Next, at 456, the accelerator hardware combines data in the corresponding memory locations to produce an SQL aggregation operation result. That is, accelerator hardware performs hierarchical reduction with thread synchronization. The accelerator hardware performs a tree-based reduction within shared memory. More specifically, the function begins with the largest step size, progressively reducing it by half in each iteration, merges data from separate memory locations, and utilizes barrier (sync) commands to ensure that all threads complete each step before proceeding. This approach utilizes a logarithmic method (e.g., log 2) and efficiently combines data across threads with minimal synchronization points.

The accelerator hardware performs thread synchronization (e.g., barrier command), which coordinates threads working across different memory tiers. Synchronization mechanisms halt threads until the threads reach a specific execution point. For local memory operations, synchronization ensures thread-specific calculations complete before proceeding. With shared memory operations, synchronization ensures that all writes are completed before any thread reads the data. For global memory access, synchronization prevents race conditions by making updates visible to all compute units. Synchronization mechanisms create consistent execution checkpoints across all memory tiers.

At 458, once all threads have finished processing their input data chunks and threads have been synchronized, the accelerator hardware performs a final consolidation. The accelerator hardware merges excess data in shared memory into global memory. This ensures all aggregated results are available in global memory for final output or further processing. The accelerator hardware 130 calculates the results of the output sum formula 208: Output_sum[M[*]]+=A[*]. And then, it returns that back to method 420 of FIG. 4B.

FIG. 5 illustrates example Compute Unified Device Architecture (CUDA) pseudocode 500 that can be used to implement the method 440 described above. The pseudocode defines a function called memory_tier_prioritized_aggregation. The function shows a data aggregation process that runs on accelerator hardware (e.g., accelerator hardware 130). Each thread processes its assigned data using a hierarchical three-tiered memory system. The threads execute this function in parallel. This function includes a main loop 502 ("Loop for each thread T_ID") that repeats three stages of the function for each thread (T_ID).

The first stage 504 (marked by "//stage 1") handles the initial distribution of data across the hierarchical three-tiered memory system. Each thread examines input data and places its values in the appropriate memory tiers. The selection decision determines which memory tier utilizes memory-tile size thresholds (e.g., available register space per thread or shared memory per thread block) to optimize memory usage.

At 506, the code, "//For each data input[x] owned by this thread," instructs each thread to work in parallel on different portions of the input data and process only its assigned data elements. At 508, the code, "if input[x]< (Registers_per_computeunit/Threads_per_computeunit-ε_0)," determines whether the input value is "small" enough for thread-local memory. It does this by comparing the input value against the available register space per thread minus an adjustment for administrative overhead. At 510, the administrative overhead adjustment is indicated by epsilon (e.g., ε_0).

If so, the code at 512 of the function ("local[input[x]]+=weight[x]") adds value (e.g., weight) directly to the thread-local memory at position input[x]. Direct addition is employed because local memory is private to each thread, i.e., thread-private. Since it is thread-private, no atomic operation is necessary because only one thread is accessing the local memory.

At 514, the code ("elif input[x]<(Sharedmem_per_computeunit/(Threads_per_computeunit/Class_Size))-ε_1") is triggered when the input values are not sufficiently "small" enough to utilize local memory. This code determines whether the input value is "medium-sized" for shared memory. It does this by comparing the input value against the available shared memory per thread block minus an adjustment for administrative overhead. At 516, the administrative overhead adjustment is indicated by another epsilon (e.g., ε_1) label.

If so, the code at 518 of the function ("atomicAdd (Sharedmem_space[0, input[x]], weight[x])") uses an atomic operation to safely add a value (e.g., "weight") to shared memory. An atomic operation prevents race conditions when multiple threads update the same memory location.

At 520, the code ("else: atomicAdd(global_mem[input[x]], weight[x])") is a trigger for all other input values that are too large for use with local or shared memory. Instead, this code utilizes global memory. The code performs an atomic operation to safely add a value (e.g., "weight") to global memory. For shared and global memory, atomic operations prevent race conditions when multiple threads update the same location.

At 522, a thread synchronization operation ("barrier( )") is performed. This synchronizes all threads of the compute unit and ensures that all threads complete stage 1 before proceeding. This thread synchronization operation is performed to prevent data hazards in subsequent operations.

Data hazards in parallel processing occur when threads access memory in conflicting ways. Barriers help prevent these issues. Read-After-Write hazards may occur when a thread reads data before another finishes writing it. Write-After-Read hazards may occur when a thread updates values before another finishes reading. Write-After-Write conflicts may occur when multiple threads write to the same location unpredictably. Reduction hazards appear when intermediate results combine incorrectly. Race conditions develop when operations depend on timing between threads. Barriers force all threads to synchronize before continuing, ensuring operations complete in the correct order.

At 524, the code ("merge(to=Sharedmem_space[T_ID,*], source=local[*])") copies all—the asterisk indicates the operation applies to all elements—thread-local data to the thread-specific area in shared memory. Each thread places its local data in a designated shared memory location.

At 526, another thread synchronization operation ("barrier( )") is performed. This inserts a second synchronization point and ensures that all thread-local data is copied to shared memory.

The second stage 528 (marked by "//stage 2") performs reduction where data is combined across the threads. The second stage 528 performs a tree-based reduction within shared memory. More particularly, the function starts with the largest step size, progressively reduces the step size by half in each iteration, merges data from separate memory locations, and uses barrier commands to ensure that all threads finish each step before proceeding. This uses a logarithmic approach (e.g., log 2) and efficiently combines data across threads with minimal synchronization points.

At 530, the code ("//For step=log 2((Registers_per_computeunit/Threads per_computeunit)−ε_0)−1 down to 1") generates a loop that processes input data through a binary tree pattern. The loop starts with a large step value and decreases it by half in each iteration. The initial step value equals log 2 of available register space per thread minus the ε_0 adjustment overhead, then decreased by 1.

The logarithmic approach enables efficient data combination across memory locations. Each iteration merges data from memory locations separated by the current step size. As the step size shrinks, data points move closer together until fully combined. This pattern allows multiple reductions to happen simultaneously. The first iteration processes widely separated data. Later iterations work with increasingly nearby data points. The entire reduction completes in log (n) steps rather than linear n steps.

The approach minimizes thread idle time and reduces the number of synchronization points. Each step handles memory addresses based on T_ID plus an offset calculated from the current step size. The mathematical pattern ensures no memory conflicts occur between parallel operations. This design makes effective use of hardware parallelism while maintaining the correct aggregation result.

At 532, the code ("merge(to=Sharedmem_space[T_ID], source=Sharedmem_space[T_ID+(1<<step)])") performs a merge operation that combines data from two shared memory locations into one. The target memory location receives data from a source location calculated using T_ID and step value. A bit-shift operation ("(1<<step") generates powers of two based on the present step value. Each decreasing step value reduces the distance between memory addresses by half. This effectively creates a tree-like reduction pattern.

Early iterations combine widely separated data points. Later iterations work with closely positioned values. The distance between addresses shrinks from large powers of two to smaller ones with each loop. The pattern completes aggregation in logarithmic time. Eight data elements combine in just three steps instead of seven.

Note that under the log 2 reduction mechanism, the TID-th thread will only write data to the shared memory offset belonging to the local TID only, and this area will not be updated by another TID. Therefore, even if the shared memory is shared by all TIDs, no atomic transaction is required when TID-th threads update the data to its dedicated offset in this shared memory.

At 534, a thread synchronization operation ("barrier( )") is performed after each reduction step. This prevents race conditions during merging operations. At 536, a final thread synchronization operation ("barrier( )") is performed before stage three. This ensures that all reduction operations are complete.

The third stage 538 (marked by "//stage 3") represents the final consolidation phase. In the third stage 538, the accelerator hardware merges excess data in shared memory into global memory. This ensures all aggregated results are available in global memory for final output or further processing.

At 540, the code ("//merge(to=global_mem[*], from=Sharedmem_excess[*])") moves excess data from shared memory to global memory. Excess data refers to aggregated values that don't fit in the shared memory tier and must be moved to global memory. This may occur, for example, when either the input values exceed shared memory thresholds or when intermediate results grow too large during the aggregation process.

This completes the aggregation operation. The final results are available in the global memory for further use, such as passing them back to the database engine that delegated the function to the accelerator hardware. The function optimizes performance by keeping frequently accessed data in faster memory tiers when possible, reducing expensive global memory operations.

Turning now to FIGS. 6-9, a second embodiment of the present disclosure will now be described. The second embodiment can be implemented on the computing system 100 of FIG. 1, described above, and is applicable to join operations 602, such as SQL join operations. In a SQL join operation 602, values of particular columns (keys) in rows from two tables are compared to determine whether they satisfy a join condition, and if so, the rows are joined according to a matching process, such as INNER JOIN, RIGHT JOIN, LEFT JOIN, etc. For example, INNER JOIN TableB ON TableA.id=TableB.id would return only the rows with matching values for the id column in both Tables A and B.

Figure 6:
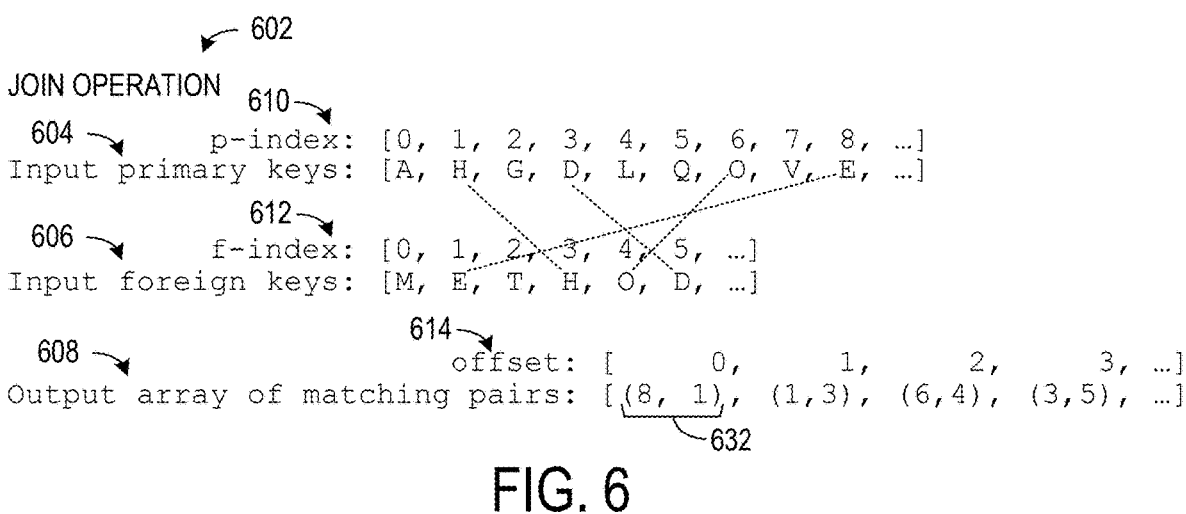
FIG. 6 illustrates a join operation that can be performed by the computing system of FIG. 1, according to another example of the present disclosure.

FIG. 6 shows the following input primary keys 604 and input foreign keys 606 as an example.

Input primary keys: [A, H, G, D, L, Q, O, V, E]

Input foreign keys: [M, E, T, H, O, D]

To perform an inner join operation on this data, matching pairs of values in each of the input primary keys 604 and input foreign keys 606 are first identified. To identify the matching pairs, each of the input primary keys 604 is compared to each of the input foreign keys 606 for a match, and if a match is determined, then the resulting index values from the input primary key (p-index 610) array and input foreign key (f-index 612) array are written as a data pair in an output array 608, as follows. The output array 608 of matching pairs contains an array of pairs of index values for the primary key and foreign key at which the matching values are contained. In the example shown, H, D, O, and E are found to match, and the corresponding pair of index values 632 is written to the output array at locations indicated by index values 0, 1, 2, and 3 as follows:

Output array of matching pairs (p-index, f-index): [(8, 1), (1,3), (6,4), (3,5)]

The operation to determine matching pairs can be performed at accelerator hardware 130 as described above. In will be appreciated that as described above, computing system 100 can be provided that includes a central processing unit 112 configured to execute a database program 122 and further configured with accelerator hardware 130 having a plurality of compute units 140, 150. Each compute unit 140, 150 has access to private local memory 146, 156 for each thread 160, 164. The accelerator hardware 130 further includes shared memory 142, 152 that can be accessed by all threads 160, 164 within all warps 616, 618 within each thread block 620, 622 instantiated by the compute units 140, 150, and global memory 136 that can be accessed by all threads 160, 164 in all thread blocks 620, 622 executed on the compute units 140, 150. The accelerator hardware 130 can be configured to execute a structured query language (SQL) join operation 602 on input data at the direction of the database program 122.

To parallelize the computation of the matching pairs of the join operation, the input foreign keys 606 are stored in global memory 136 and respective subsets 624 of the input primary keys 604 are sent to corresponding threads 160, 164 and stored in the local memory 144, 154 for each thread 160, 164. The threads 160, 164 then compare each input primary key 604 in their local memory 144, 154 to each of the input foreign keys 606 stored in global memory, and if a match is determined then the thread 160, 164 writes the result to an output array 608 in global memory 136.

Each thread 160, 164 needs to write its output pair to the next available location in the output array 608 in the global memory in a coordinated manner, so that the thread doesn't overwrite data written by other threads or skip locations in the output array 608. One prior approach to accomplishing this is for the threads to obtain the current value of a global counter pointing to the current offset location and increment this counter in the same operation, using the following CUDA command my_offset=atomicAdd (&output_index, 1). For each thread implementing this atomicAdd command, the command (1) retrieves the offset value stored at the memory location pointed to by the pointer &output_index, (2) adds 1 to the retrieved offset value to obtain an incremented offset value, (3) writes the incremented offset value to the memory location at &output_index, and (4) returns the retrieved offset value (i.e., the value prior to incrementing) as my_offset. The thread can then implement a write command to write the pair of values for the p-index and f-index of the matching values to the output array at the value retrieved for my_offset.

A technical problem with this prior approach is that the atomicAdd command is blocking of other threads and thus the threads can only perform the computations for determining the matching pairs serially, effectively limiting the performance of the join operation to a serial or near-serial operation. Thus, a join operation executed in this manner on accelerator hardware does not achieve the benefits of parallelization.

Figure 7:
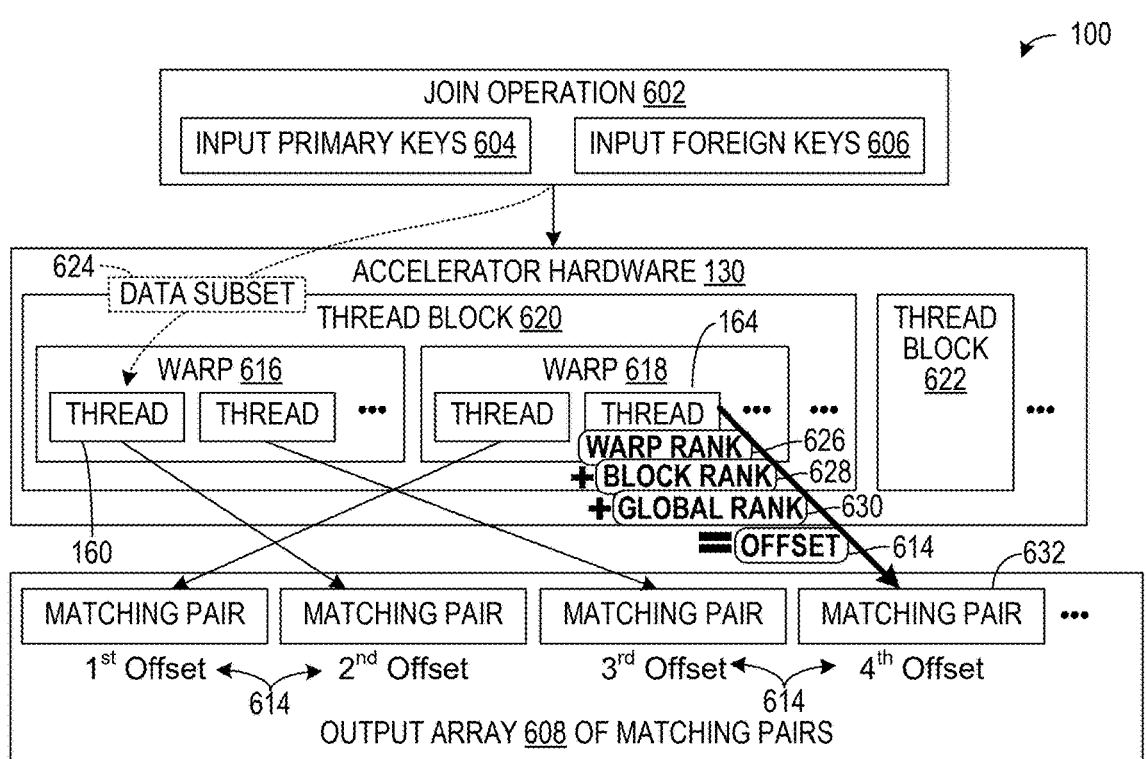
FIG. 7 is a schematic view showing the join operation being implemented on the accelerator hardware of the computing system of FIG. 1.

To address this issue, as shown in FIG. 7, the second embodiment of the present disclosure utilizes an approach in which each thread computes its offset 614 in the output array 608 as the sum of three variables: a warp rank 626, a block rank 628, and a global rank 630. The warp rank 626 is the in-warp rank of the current thread 160, 164, the block rank 628 is the in-block rank of the current warp 616, 618, and the global rank 630 is the rank of the current thread block 620, 622 among all thread blocks 620, 622 performing the matching pair computation for the join operation.

Turning now to FIG. 8, a method 800 according to the second embodiment of the present disclosure is described. Method 800 can be implemented using computing system 100 described above or other suitable computing hardware. Method 800 includes, at 802, receiving a request for a join operation on two or more tables of data. The request typically includes an identification of pair of columns to compare for matching in the join operation. One of the columns is typically designated as primary keys and the other column is typically designated as foreign keys.

At 804, the method typically includes performing parallel computation of identification of the matching pairs of the join operation at accelerator hardware as described above. The method typically includes performing parallel computation at each of a plurality of threads in each of a plurality of warps in each of a plurality of thread blocks on a plurality of compute units of the accelerator hardware. At 806, at each of the plurality of threads in each of the plurality of warps, the method includes, at 808, determining if a pair of values stored at a primary key and a foreign key are a matching pair. At 810, the method includes, if the pair of values is a matching pair, then computing an intra-warp rank for the respective thread within the respective warp using local memory of the respective thread. Steps 808 and 810 are performed each time a thread finds a match, and thus when each match is found, the intra warp rank is updated. The intra warp rank refers to a rank of the thread compared to all other threads in the warp, based on a comparison of the number of matches each thread has found. Thus, the rank is a rank of detected matching pairs by each thread. Once all threads have executed, the intra warp ranks for all threads have been computed and stored in their local memories.

At 812, the method further includes creating a location in shared memory to store a to-be-computed intra block rank of each warp. At 814, the method includes syncing the plurality of threads to ensure that all threads have completed before proceeding to the next step where the intra block rank is generated. At 816, the method further includes, at one of the plurality of threads in each warp (such as the first thread), computing an intra block rank of each respective warp and storing the intra block rank at the location in shared memory. In this way, each warp can store its rank within the thread block in shared memory, the rank being based on how many matching pairs are included in each warp of threads. At 818, the method includes once again syncing the plurality of threads, prior to computation of the global rank.

At 820, at one of the plurality of threads in each thread block, the method includes computing a global rank of each respective block using global memory. The global rank is based on the number of matching pairs determined within each thread block. Once again at 822, the method includes syncing the plurality of threads.

The method includes, at 824, for each thread that has determined a matching pair, as shown at 826, computing an offset in an output tuple by adding the global rank of the respective block, the intra block rank of the respective warp, and the intra warp rank of the respective thread, and as shown at 828, storing index values for the primary key and the foreign key in the matching pair at the offset location in the output tuple. At 830, the method includes outputting the output tuple containing the index values for the matching pairs.

At 832, the method includes retrieving the value for the primary key at the primary key index and the value for the foreign key at the foreign key index for each matching pair. At 834, the method includes creating a join result data structure including the primary key value and the foreign key value for each matching pair. At 836, the method includes outputting the join result data structure.

FIG. 9 illustrates example CUDA pseudocode that can be used to implement the method 800 described above. The pseudocode defines a function called warp_based_fast_join. In this function, each thread (threadID) probes for matches between values for primary keys and foreign keys in its task list. In stage 1 of the pseudocode, vote returns a bitmask of threads in the warp that have is_match=true, and popc counts the number of bits set to 1 in vote, to give the accumulated votes (accum) for the warp, which indicates how many matching pairs have been found by all threads in the warp. The warp_rank expression calculates the rank of the current thread within the warp based on the number of matching pairs found by all threads in the warp as indicated by vote. In stage 2, the pseudocode defines a variable (intra_block_order[0]) stored in shared memory, to store the intra block order of the current warp, followed by a barrier (or syncthreads) command to ensure all threads complete this before proceeding. Stage 2 concludes with block_rank being computed by one thread per warp (the first thread in the warp in this example where index satisfies threadID % threadsperwarp==0) by performing an atomicAdd to add the value of accum to the intra_block_order in shared memory. In this way, the warp can compute its rank within the thread block, based on the number of matching pairs identified. In stage 3, the first thread in each thread block where threadID==0 computes a global rank of each thread block among all thread blocks processing the join operation matching pair computation by performing an atomic addition on global memory which adds intra_block_order[0] to output_offset[0] and returns the old (original) value of output_offset[0]. Then, each thread that contains a matching pair (is_match=true) computes an offset to write its output to the output tuple in global memory, by adding the global_rank of the current thread block among all thread blocks involved in the matching pair computation, the block_rank of the current warp within the thread block, and the warp_rank of the current thread within its warp. The pseudocode concludes by writing the results of the matching determination. Each thread writes the primary key index and foreign key index of its matching pair to the output tuple at the computed offset in global memory.

Using the method 800 of the second embodiment, parallelization of the computation of the matching pairs is enhanced, and the potential for atomic collisions greatly reduced. This has the benefit of speeding the processing of SQL join operations that are accelerated by acceleration hardware.

Figure 10:
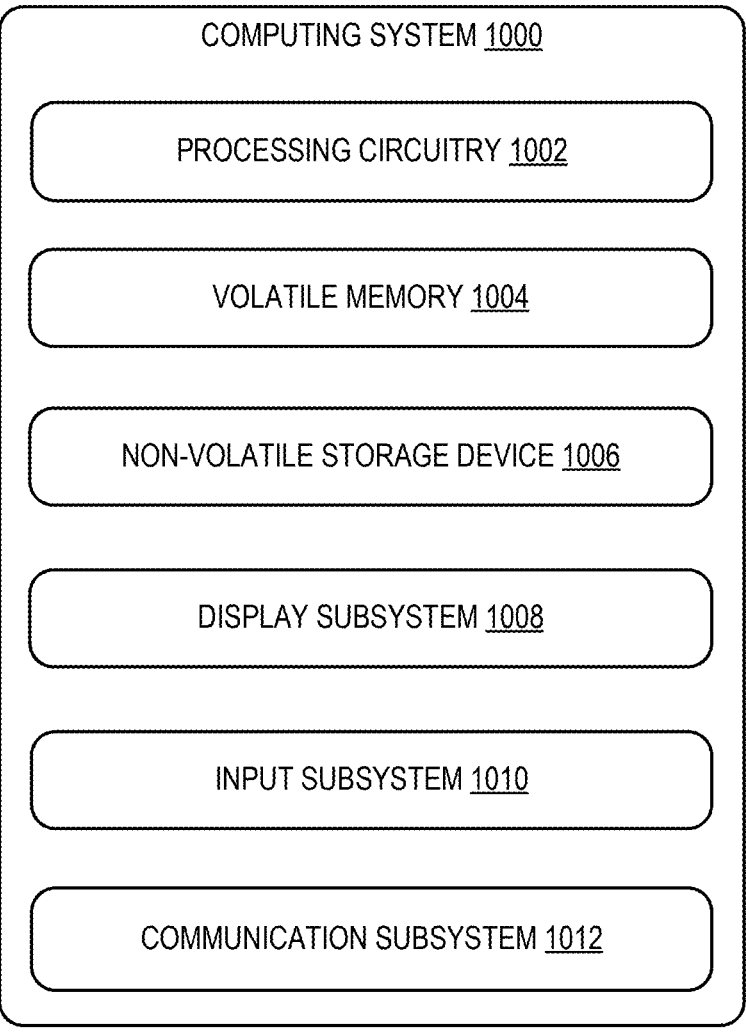
FIG. 10 illustrates an example computing environment of the present disclosure.

FIG. 10 schematically shows a non-limiting embodiment of a computing system 1000 that can enact one or more of the methods and processes described above. Computing system 1000 is shown in simplified form. Computing system 1000 may embody the computer systems 100 described above. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic processor 1002 volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-program-mable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; and/or any other suitable sensor.

When included communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The following paragraphs provide additional description of the subject matter of the present disclosure. In one aspect, a computing system is provided, comprising: a central processing unit configured to execute a database program; and accelerator hardware configured to perform parallel computation of matching pairs of a join operation of the database program at least in part by performing the following operations. The accelerator hardware is configured to receive a request for the join operation on two or more tables of data, the request including an identification of pair of columns to compare for matching in the join operation, one of the columns being designated as containing primary keys and the other column being designated as containing foreign keys. The accelerator hardware is configured to, at each of a plurality of threads in each of a plurality of warps that are grouped into a plurality of thread blocks, determine if a pair of values stored at one of the primary keys and one of the foreign keys are a matching pair, and, if the pair of values is a matching pair, then compute an intra warp rank for the respective thread within the respective warp using local memory of the respective thread. The accelerator hardware is configured to, at one of the plurality of threads in each warp, compute an intra block rank of each respective warp and storing the intra block rank at a location in shared memory. The accelerator hardware is configured to, at one of the plurality of threads in each thread block, compute a global rank of each respective block using global memory. The accelerator hardware is configured to, for each thread that has determined a matching pair, compute an offset in an output tuple by adding the global rank of the respective block, the intra block rank of the respective warp, and the intra warp rank of the respective thread. The accelerator hardware is configured to store index values for the primary key and the foreign key in the matching pair at the offset location in the output tuple, and output the output tuple.

In this aspect, the accelerator hardware can be further configured to retrieve the value for the primary key at the primary key index and the value for the foreign key at the foreign key index for each matching pair.

In this aspect, the accelerator hardware can be further configured to, create a join result data structure including the primary key value and the foreign key value for each matching pair.

In this aspect, the accelerator hardware can be further configured to output the join result data structure to a storage location or downstream program.

In this aspect, the join operation can be a structured query language (SQL) join operation.

In this aspect, the accelerator hardware can include: a plurality of compute units, each compute unit being configured to execute a plurality of threads grouped into warps, the warps being grouped into thread blocks, the local memory of the accelerator hardware being privately accessible by each thread, the shared memory of the accelerator hardware being mutually accessible by each thread in one of the thread blocks, and the global memory being mutually accessible by all threads in all thread blocks performing the parallel computation.

In this aspect, the accelerator hardware can be a graphics processing unit, a tensor processing unit, and/or neural processing unit.

In this aspect, the accelerator hardware can be an integrated circuit, and the local memory and shared memory are provided on-chip, in the integrated circuit.

In this aspect, the global memory can be provided off-chip of the integrated circuit.

In this aspect, the accelerator hardware and central processing unit can be formed in a system-on-chip (SoC).

In another aspect, a computerized method for use in processing a join operation of a database program with accelerator hardware is provided, the method comprising: via the accelerator hardware, performing parallel computation of matching pairs of a join operation of the database program at least in part by performing the following operations. The operations include receiving a request for the join operation on two or more tables of data, the request including an identification of pair of columns to compare for matching in the join operation, one of the columns being designated as containing primary keys and the other column being designated as containing foreign keys. The operations further include at each of a plurality of threads in each of a plurality of warps that are grouped into a plurality of thread blocks, determining if a pair of values stored at one of the primary keys and one of the foreign keys are a matching pair, and, if the pair of values is a matching pair, then computing an intra warp rank for the respective thread within the respective warp using local memory of the respective thread. The operations further include at one of the plurality of threads in each warp, computing an intra block rank of each respective warp and storing the intra block rank at a location in shared memory. The operations further include, at one of the plurality of threads in each thread block, computing a global rank of each respective block using global memory. The operations further include, for each thread that has determined a matching pair, computing an offset in an output tuple by adding the global rank of the respective block, the intra block rank of the respective warp, and the intra warp rank of the respective thread. The operations further include storing index values for the primary key and the foreign key in the matching pair at the offset location in the output tuple, and outputting the output tuple.

In this aspect, the operations can further include retrieving the value for the primary key at the primary key index and the value for the foreign key at the foreign key index for each matching pair.

In this aspect, the operations can further include creating a join result data structure including the primary key value and the foreign key value for each matching pair.

In this aspect, the operations can further include outputting the join result data structure to a storage location or downstream program.

In this aspect, the join operation is a structured query language (SQL) join operation.

In this aspect, the accelerator hardware can includes: a plurality of compute units, each compute unit being configured to execute a plurality of threads grouped into warps, the warps being grouped into thread blocks, the local memory of the accelerator hardware being privately accessible by each thread, the shared memory of the accelerator hardware being mutually accessible by each thread in one of the thread blocks, and the global memory being mutually accessible by all threads in all thread blocks performing the parallel computation.

In this aspect, the accelerator hardware can be a graphics processing unit, a tensor processing unit, and/or neural processing unit.

In this aspect, the accelerator hardware can be an integrated circuit, and the local memory and shared memory are provided on-chip, in the integrated circuit.

In this aspect, the global memory can be provided off-chip of the integrated circuit.

According to another aspect, accelerator hardware for use with a central processing unit of a computing system is provided, the accelerator hardware comprising: a plurality of compute units, each compute unit being configured to execute a plurality of threads grouped into warps, the warps being grouped into thread blocks, a local memory of the accelerator hardware being privately accessible by each thread, a shared memory of the accelerator hardware being mutually accessible by each thread in one of the thread blocks, and a global memory being mutually accessible by all threads in all thread blocks performing the parallel computation, wherein the compute units of the accelerator hardware are configured to perform parallel computation of matching pairs of a join operation of the database program at least in part by the following operations. The operations include receiving a request for the join operation on two or more tables of data, the request including an identification of pair of columns to compare for matching in the join operation, one of the columns being designated as containing primary keys and the other column being designated as containing foreign keys. The operations further include, at each of a plurality of threads in each of a plurality of warps that are grouped into a plurality of thread blocks, determining if a pair of values stored at one of the primary keys and one of the foreign keys are a matching pair, and, if the pair of values is a matching pair, then computing an intra warp rank for the respective thread within the respective warp using local memory of the respective thread. The operations further include, at one of the plurality of threads in each warp, computing an intra block rank of each respective warp and storing the intra block rank at a location in shared memory. The operations further include, at one of the plurality of threads in each thread block, computing a global rank of each respective block using global memory. The operations further include, for each thread that has determined a matching pair, computing an offset in an output tuple by adding the global rank of the respective block, the intra block rank of the respective warp, and the intra warp rank of the respective thread. The operations further include, storing index values for the primary key and the foreign key in the matching pair at the offset location in the output tuple, and outputting the output tuple.

In some embodiments, the methods and processes described herein may be tied to a computing system of one or more computing devices. In particular, such methods and processes may be implemented as a computer-application program or service, an application-programming interface (API), a library, and/or other computer-program product.

It will be understood that the configurations and/or approaches described herein are exemplary in nature and that these specific embodiments or examples are not to be considered in a limiting sense because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a central processing unit configured to execute a database program; and accelerator hardware configured to perform parallel computation of matching pairs of a join operation of the database program at least in part by:

receiving a request for the join operation on two or more tables of data, the request including an identification of pair of columns to compare for matching in the join operation, one of the columns being designated as containing primary keys and the other column being designated as containing foreign keys;

at each of a plurality of threads in each of a plurality of warps that are grouped into a plurality of thread blocks, determining if a pair of values stored at one of the primary keys and one of the foreign keys are a matching pair, and, if the pair of values is a matching pair, then computing an intra warp rank for the respective thread within the respective warp using local memory of the respective thread;

at one of the plurality of threads in each warp, computing an intra block rank of each respective warp and storing the intra block rank at a location in shared memory;

at one of the plurality of threads in each thread block, computing a global rank of each respective block using global memory;

for each thread that has determined a matching pair, computing an offset in an output tuple by adding the global rank of the respective block, the intra block rank of the respective warp, and the intra warp rank of the respective thread;

storing index values for the primary key and the foreign key in the matching pair at the offset location in the output tuple; and outputting the output tuple.

2. The computing system of claim 1, further comprising:

retrieving the value for the primary key at the primary key index and the value for the foreign key at the foreign key index for each matching pair.

3. The computing system of claim 2, further comprising:

creating a join result data structure including the primary key value and the foreign key value for each matching pair.

4. The computing system of claim 3, further comprising:

outputting the join result data structure to a storage location or downstream program.

5. The computing system of claim 1, wherein the join operation is a structured query language (SQL) join operation.

6. The computing system of claim 1, wherein the accelerator hardware includes: a plurality of compute units, each compute unit being configured to execute a plurality of threads grouped into warps, the warps being grouped into thread blocks, the local memory of the accelerator hardware being privately accessible by each thread, the shared memory of the accelerator hardware being mutually accessible by each thread in one of the thread blocks, and the global memory being mutually accessible by all threads in all thread blocks performing the parallel computation.

7. The computing system of claim 6, wherein the accelerator hardware is a graphics processing unit, a tensor processing unit, and/or neural processing unit.

8. The computing system of claim 6, wherein the accelerator hardware is an integrated circuit, and the local memory and shared memory are provided on-chip, in the integrated circuit.

9. The computing system of claim 8, wherein the global memory is provided off-chip of the integrated circuit.

10. The computing system of claim 6, wherein the accelerator hardware and central processing unit are formed in a system-on-chip (SoC).

11. A computerized method for use in processing a join operation of a database program with accelerator hardware, the method comprising:

via the accelerator hardware, performing parallel computation of matching pairs of a join operation of the database program at least in part by:

receiving a request for the join operation on two or more tables of data, the request including an identification of pair of columns to compare for matching in the join operation, one of the columns being designated as containing primary keys and the other column being designated as containing foreign keys;

at each of a plurality of threads in each of a plurality of warps that are grouped into a plurality of thread blocks, determining if a pair of values stored at one of the primary keys and one of the foreign keys are a matching pair, and, if the pair of values is a matching pair, then computing an intra warp rank for the respective thread within the respective warp using local memory of the respective thread;

at one of the plurality of threads in each warp, computing an intra block rank of each respective warp and storing the intra block rank at a location in shared memory;

at one of the plurality of threads in each thread block, computing a global rank of each respective block using global memory;

for each thread that has determined a matching pair, computing an offset in an output tuple by adding the global rank of the respective block, the intra block rank of the respective warp, and the intra warp rank of the respective thread;

storing index values for the primary key and the foreign key in the matching pair at the offset location in the output tuple; and outputting the output tuple.

12. The computerized method of claim 11, further comprising:

retrieving the value for the primary key at the primary key index and the value for the foreign key at the foreign key index for each matching pair.

13. The computerized method of claim 12, further comprising:

creating a join result data structure including the primary key value and the foreign key value for each matching pair.

14. The computerized method of claim 13, further comprising:

outputting the join result data structure to a storage location or downstream program.

15. The computerized method of claim 11, wherein the join operation is a structured query language (SQL) join operation.

16. The computerized method of claim 11, wherein the accelerator hardware includes: a plurality of compute units, each compute unit being configured to execute a plurality of threads grouped into warps, the warps being grouped into thread blocks, the local memory of the accelerator hardware being privately accessible by each thread, the shared memory of the accelerator hardware being mutually accessible by each thread in one of the thread blocks, and the global memory being mutually accessible by all threads in all thread blocks performing the parallel computation.

17. The computerized method of claim 16, wherein the accelerator hardware is a graphics processing unit, a tensor processing unit, and/or neural processing unit.

18. The computing system of claim 16, wherein the accelerator hardware is an integrated circuit, and the local memory and shared memory are provided on-chip, in the integrated circuit.

19. The computing system of claim 18, wherein the global memory is provided off-chip of the integrated circuit.

20. Accelerator hardware for use with a central processing unit of a computing system, the accelerator hardware comprising:

a plurality of compute units, each compute unit being configured to execute a plurality of threads grouped into warps, the warps being grouped into thread blocks, a local memory of the accelerator hardware being privately accessible by each thread, a shared memory of the accelerator hardware being mutually accessible by each thread in one of the thread blocks, and a global memory being mutually accessible by all threads in all thread blocks performing the parallel computation, wherein the compute units of the accelerator hardware are configured to perform parallel computation of matching pairs of a join operation of the database program at least in part by:

receiving a request for the join operation on two or more tables of data, the request including an identification of pair of columns to compare for matching in the join operation, one of the columns being designated as containing primary keys and the other column being designated as containing foreign keys;

at each of a plurality of threads in each of a plurality of warps that are grouped into a plurality of thread blocks, determining if a pair of values stored at one of the primary keys and one of the foreign keys are a matching pair, and, if the pair of values is a matching pair, then computing an intra warp rank for the respective thread within the respective warp using local memory of the respective thread;

at one of the plurality of threads in each warp, computing an intra block rank of each respective warp and storing the intra block rank at a location in shared memory;

at one of the plurality of threads in each thread block, computing a global rank of each respective block using global memory;

for each thread that has determined a matching pair, computing an offset in an output tuple by adding the global rank of the respective block, the intra block rank of the respective warp, and the intra warp rank of the respective thread;

storing index values for the primary key and the foreign key in the matching pair at the offset location in the output tuple; and outputting the output tuple.

\* \* \* \* \*